(12) United States Patent
Gupta et al.

(10) Patent No.: US 8,719,447 B2
(45) Date of Patent: *May 6, 2014

(54) HETEROGENEOUS SERVICE PROVIDER MODEL THROUGH PAY-FOR-PERFORMANCE BASED TRANSIT SETTLEMENTS

(75) Inventors: Ajit Gupta, Fremont, CA (US); Ashwath Nagaraj, Los Altos Hills, CA (US); Rajeev Bharadhwaj, Saratoga, CA (US)

(73) Assignee: Aryaka Networks, Inc., Newark, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/773,031

(22) Filed: May 4, 2010

(65) Prior Publication Data

US 2011/0276446 A1    Nov. 10, 2011

(51) Int. Cl.
*G06F 15/173*    (2006.01)
(52) U.S. Cl.
USPC .................................................. 709/240
(58) Field of Classification Search
None
See application file for complete search history.

(56) References Cited

U.S. PATENT DOCUMENTS

| 2007/0244987 | A1* | 10/2007 | Pedersen et al. | 709/217 |
| 2009/0290508 | A1* | 11/2009 | Puthenpura et al. | 370/254 |
| 2011/0010312 | A1* | 1/2011 | McDonald | 705/400 |

OTHER PUBLICATIONS

"Akamai's Application Acceleration Services:Transform the Internet into a Business-Ready Application Delivery Platform"; Akamai Technologies, Inc. ; Oct. 2008 ; 12 Pages ; (Last visited Jul. 20, 2010).
"Interconnection and Access in Telecom and the Internet" by Jean-Jacques Laffont, Scott Marcus, Patrick Rey, and Jean Tirole, May 2001. pp. 39 (Date last viewed May 4, 2010).

* cited by examiner

*Primary Examiner* — Matthew S Gart
*Assistant Examiner* — Michael Maicher
(74) *Attorney, Agent, or Firm* — Raj Abhyanker, P.C.

(57) ABSTRACT

A method and system of a heterogeneous service provider model through pay-for-performance based transit settlements are disclosed. In one embodiment, a system includes a plurality of Point of Presence (POP) locations between a head office and a branch office in a heterogeneous computer network configured to communicate data through a pay-per-performance peering relationship between different entities of the heterogeneous computer network. In this embodiment, the system implements a debit-credit mechanism configured to handle payments as well as penalties associated with violation of a pair-wise mutual agreement between independent for-profit entities providing network services in a segment of the heterogeneous computer network.

23 Claims, 16 Drawing Sheets

FEDERATION = DIFFERENT (NETWORKS) + DIFFERENT (SEGMENTS) + DIFFERENT (OWNERS)

102            104            106            108

| CHARACTERISTIC 502 | RESELLER 510 | DIRECT SALES 512 | MODIFIED RESELLER 'TYPE A' 514 | MODIFIED RESELLER 'TYPE B' 516 |
|---|---|---|---|---|
| NETWORK/OWNERSHIP 504 | SAME | SAME | SAME | HETEROGENEOUS |
| POP OWNERSHIP 506 | SAME | SAME | HETEROGENEOUS | SAME |
| CUSTOMER OWNERSHIP 508 | HETEROGENEOUS | SAME | HETEROGENEOUS | HETEROGENEOUS |

RELATIONSHIP TABLE 550

FIGURE 5

| SEGMENT | OWNERSHIP |
|---|---|
| BRANCH – CPE1 | COMPANY A |
| CPE1 - BPOP | OWNED BY PROVIDER 1, LEASES NETWORK, LICENSES COMPANY A |
| BPOP - HPOP | OWNED BY PROVIDER 2, LEASES NETWORK, LICENSES COMPANY A |
| HPOP – CPE2 | PROVIDER 3 LEASES NETWORK |
| CPE2 - HEAD | COMPANY A |

FIGURE 9

| DSL SPEED | DISTANCE |
|---|---|
| 25 MBIT/S | 1000 FEET |
| 24 MBIT/S | 2000 FEET |
| 23 MBIT/S | 3000 FEET |
| 22 MBIT/S | 4000 FEET |
| 21 MBIT/S | 5000 FEET |
| 19 MBIT/S | 6000 FEET |
| 16 MBIT/S | 7000 FEET |
| 1.5 MBIT/S | 15000 FEET |
| 800 KBIT/S | 17000 FEET |

FIGURE 12

HETEROGENEOUS SERVICE PROVIDER MODEL THROUGH PAY-FOR-PERFORMANCE BASED TRANSIT SETTLEMENTS

FIELD OF TECHNOLOGY

This disclosure relates generally to computer networking and, more particularly, to a method, an apparatus, and a system of a heterogeneous service provider model through pay-for-performance based transit settlements.

BACKGROUND

When acceleration of data in a network service provider environment is provided by a for-profit entity, routing of data, distribution of revenue, and/or billing of customers may become complicated, especially when the nodes across which acceleration is performed crosses service provider boundaries.

For example, in such environments, billing between different entities may not be scalable because of differing payment policies, service level guarantees, and/or penalty rates. Moreover, slower speed in one node may affect nodes downstream leading to a loss of service and/or revenue.

SUMMARY

Disclosed are a method, an apparatus, and a system of a heterogeneous service provider model through pay-for-performance based transit settlements. In one embodiment, a system includes a plurality of Point of Presence (POP) locations between a head office and a branch office in a heterogeneous computer network configured to communicate data through a pay-per-performance peering between different entities of the heterogeneous computer network. In this embodiment, the system implements a debit-credit mechanism configured to handle payments as well as penalties associated with violation of a pair-wise mutual agreement between independent for-profit entities providing network services in a segment of the heterogeneous computer network.

The independent for-profit entities may include an application acceleration service provider. The debit-credit mechanism may monitor the segment being a portion of a communication link between different entities of the heterogeneous computer network. An accelerating operation and/or a routing operation of data between segments may be governed by a policy consistent with the pair-wise mutual agreement.

The set of Point of Presence (POP) locations may be geographically proximate to the head office or the branch office. The set of Point of Presence (POP) locations may perform an application acceleration function 'A' for a plurality of business entities through a placement of a collaborative document, a computed document, and/or a static document of an enterprise application at a closest POP location to a requesting entity. The set of POP locations may be shared by a plurality of licensed entities of an application acceleration service. Each of the licensed entities may have at least one head office and at least one branch office. Each of the licensed entities may leverage both a shared software and a shared hardware infrastructure of the application acceleration service provider. An external network service may be contracted to at least one for-profit entity included in the pair-wise mutual agreement. The acceleration function 'A' may apply a bandwidth constraint and a latency constraint as factors of an acceleration service, thereby resulting in bandwidth savings and reduced latency between entities of the heterogeneous network.

Furthermore, a data associated with the application acceleration may be re-routed during an intermediate POP failure through an alternate route associated with another POP location in the computer network. A service provider may own a link or an equipment to perform the application acceleration service. The application acceleration may be performed as a service without any Customer Premise Equipment (CPE) in the head office and the branch office.

In an alternate embodiment, a CPE may optionally be used. While the Customer Premise Equipment is not required for the application acceleration service to be operational in one embodiment as described above, a Customer Premise Equipment (CPE) device may optionally be deployed along with an optional branch router and an optional head-office router coupled with at least one of the head office and the branch office: The optional CPE may perform an Advanced Redundancy Removal (ARR) function to avoid sending previously sent patterns in at least one of a transport stream and a packet stream. The optional CPE may perform TCP proxies, with varying policies for at least one of TCP windows, buffering and security. In addition, protocol dependent split proxies may be performed on the transport stream and/or the packet stream. A secure transport data sent over secure tunnels of the collaborative document, the computed document, and/or the static document may be generated. The secured transport data between a client device in the branch office and the head office may be communicated, with optional intervening firewalls, through an Internet Protocol Security (IPsec) tunnel, a Generic Routing Encapsulation (GRE) tunnel, VLAN, and/or MPLS labels using IP headers.

A bandwidth and latency may be measured across a sub-network in a segment of the heterogeneous computer network from a third-party provider included in the pair-wise mutual agreement. A requisite network software and a requisite network hardware from another third-party provider may be in one of the pair-wise mutual agreement and another pair-wise mutual agreement associated with the heterogeneous network is utilized. An insertion model may be configured to connect to the POP locations in the heterogeneous computer network based on any one of obtaining network connectivity from a customer premises, securing the network connection, and routing through the computer network.

The heterogeneous computer network may be an intercontinental heterogeneous network comprising a union of the computer network and another intercontinental computer network to provide unified network coverage. In other embodiments, the heterogeneous computer network may be a regional heterogeneous network comprising a union of the computer network and a regional computer network, the regional computer network being more localized than an intercontinental computer network.

In yet another embodiment, the heterogeneous computer network may be an exchange heterogeneous network configured to provide increased acceleration at a reduced cost in the computer network through performing of an increased acceleration in a localized region including one of the head office and the branch office using a third-party equipment, the third-party being governed by the pair-wise mutual agreement.

In a further embodiment, the heterogeneous computer network may be a vendor heterogeneous network configured to provide increased acceleration in the computer network through utilization of additional acceleration capabilities of a third-party vendor equipment in conjunction with the existing acceleration capabilities in the heterogeneous computer network system, the third-party vendor being governed by another pair-wise mutual agreement.

In yet a further embodiment, the heterogeneous computer network may be a service heterogeneous network configured to switch between external network service vendors based on proximity to at least one of the head office and the branch office, the external service vendors being governed by pair-wise mutual agreements.

A mutual relationship between segments of the heterogeneous computer network system may be established on a per flow basis to securely share resources, the flow signifying a packet flow from a source to a destination. Segment data associated with a network service usage may be collected on a packet flow from a source to a destination a per day basis, a per week basis, a per month basis, a per link basis, and/or a per flow basis. A service abstraction and a Transport Control Protocol (TCP) optimization may be implemented in the heterogeneous computer network system. A remediation mechanism and a repudiation mechanism may be configured to handle a breach of a contract is specified.

The breach of the contract may be determined to enable an initiation of the at least one of the remediation mechanism and the repudiation mechanism. A record associated with the network service usage may be analyzed to generate an application acceleration service customer bill.

In another aspect, a method includes configuring a plurality of Point of Presence (POP) locations between a head office and a branch office in a heterogeneous computer network, communicating data through a pay-per-performance peering relationship between different entities of the heterogeneous computer network, and implementing a debit-credit mechanism to handle payments as well as penalties associated with violation of a pair-wise mutual agreement between independent for-profit entities providing network services in a segment of the heterogeneous computer network.

In yet another aspect, a system includes a heterogeneous computer network configured to communicate data through a pay-per-performance peering relationship between different entities of the heterogeneous computer network, and a debit-credit mechanism configured to handle payments as well as penalties associated with violation of a pair-wise mutual agreement between independent entities providing network services in a segment of the heterogeneous computer network.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 is a relationship table that describes various 502 and their related relationships, according to one or more embodiments.

FIG. 9 is a table view detailing ownerships in a multi-segment POP-POP architecture analogous to the multi-segment POP-POP architecture of FIG. 8, according to one or more embodiments.

FIG. 12 is a table view of Digital Subscriber Link (DSL) speeds and associated distances from Digital Subscriber Line Access Multiplexer (DSLAM) equipment, according to one or more embodiments.

Figure 1:
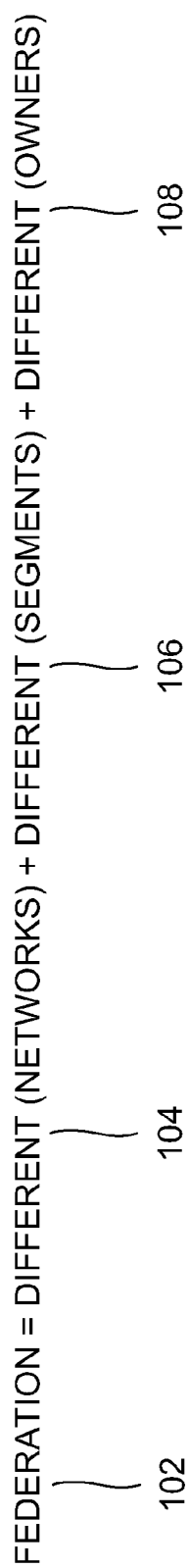
FIG. 1 is an example definition view of a federation, according to one or more example embodiments.

Other features of the present embodiments will be apparent from the accompanying drawings and from the detailed description that follows.

DETAILED DESCRIPTION

Example embodiments, as described below, may be used to realize a method, an apparatus, and a system of a heterogeneous service provider model through pay-for-performance based transit settlements. Although the present embodiments have been described with reference to specific example embodiments, it will be evident that various modifications and changes may be made to these embodiments without departing from the broader spirit and scope of the various embodiments.

Within the Internet, an autonomous system (AS) may be a collection of connected Internet Protocol (IP) routing prefixes under the control of one or more network operators that present a common, clearly defined routing policy to the Internet (e.g., RFC 1930, Section 3). The autonomous system may require control by a single entity (e.g., an Internet service provider) and/or a very large organization with independent connections to multiple networks that adhere to a single and clearly defined routing policy. In one or more embodiments, Heterogeneous Systems (HS) may be in different autonomous systems.

In alternate embodiments, a heterogeneous system may be multiple organizations that can run BGP using private HS numbers to an ISP that connect all those organizations to the Internet. Even though there are multiple Autonomous Systems supported by the ISP, the Internet may only see the routing policy of the ISP. That ISP may have an officially registered Autonomous System Number (ASN). A unique HSN may be allocated to each HS for use in BGP routing. HS numbers may be important because the HSN may uniquely identify each network on the Internet.

Peering may require physical interconnection of the networks, an exchange of routing information through a Border Gateway Protocol (BGP) routing protocol and may often accompanied by peering agreements of varying formality, from "handshake" to thick contracts. Peering relationships may take the form of bi-directional contracts between autonomous systems (e.g., Internet infrastructure service providers). For example, peering may be a voluntary interconnection of administratively separate Internet networks for the purpose of exchanging traffic between the customers of each network. It will be appreciated that "a customer" may be a person and/or an entity such as an internet service provider (ISP) who is a beneficiary of a product and/or service, according to one embodiment. In addition, peering may be settlement-free meaning that neither party pays the other for the exchanged traffic (e.g., each derives revenue from its own customers only).

In this model, the sender may keep all of the revenue and not share it with a peered network. Sometimes, such arrangements may be disfavored because quality of service for customers may suffer because providers may choose to use a peer provider's network even when capacity is available in their own network (e.g., "hot potato" routing). Switchover delays may be created as data is transferred between networks. Furthermore, the peer provider's network may have a longer path than that of the primary network.

Settlement-based peering may solve the "hot potato" routing problem. Such a system may be referred to as a 'transit' system in which consideration (e.g., money, settlement, etc.) is provided for the right to use another network for Internet access (e.g., transit). The various embodiments described herein may account for the inequities in financial, service-level, and/or volume flows of such settlement-based peering relationships, particularly when one provider provides services (e.g., content acceleration, application acceleration, compression, decompression, etc.) that may require expensive hardware and/or software resources. In one embodiment, pay per performance transit settlement based peering mechanisms are used herein.

Figure 2:
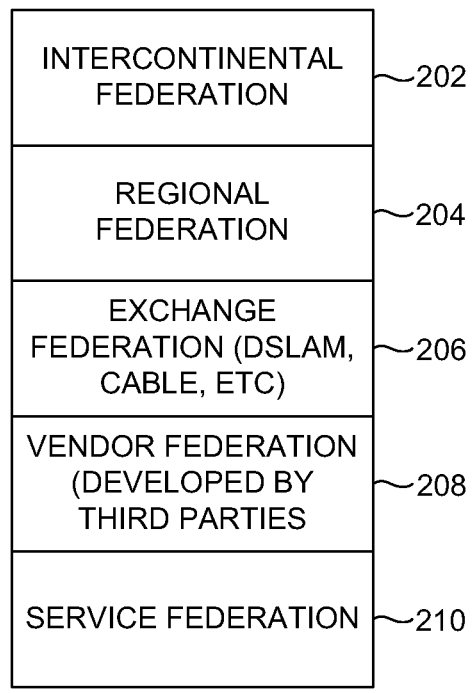
FIG. 2 is a table view illustrating different federation types, according to one or more embodiments.

FIG. 1 illustrates an example definition of a federation 102, according to one or more example embodiments. In one or more embodiments, the federation 102 may include one or more networks 104, one or more segments 106, and one or more owners 108 who control one or more networks and segments. One or more networks as described herein may include different networks. Also, one or more segments 106 as described herein may include different segments. In one or more embodiments, the federation 102 may be a collection of disparate network entities that may cooperate with one another for a purpose of routing traffic between a source and a destination. In one or more embodiments, the cooperation may be involve cooperation in terms of access to service, service level guarantees and their associated payments and penalties between nodes of a federation. In addition, the cooperation may also be based on Service Level Agreements (SLAs) and contracts. Application may be accelerated through the networks 104 and segments 106. In one or more embodiments, there may be different types of federation formed based on the networks 104. A subset of such classification is illustrated in FIG. 2.

A "pair-wise mutual agreement" may be a binding agreement between a service provider and a customer in which both parties share obligations to perform and provide access to network resources in exchange for associated consideration (e.g., payments). A consequence of failure to perform may take a form of negotiated sanctions (e.g., penalties).

"Penalties" may refer sanctions or other means of enforcement used to provide incentives for obedience with the rules of a pair-wise mutual agreement, according to one embodiment. When viewed at the time of breach, penalties may be disadvantages (e.g., monetary, service level, positional, relational, etc.) incurred by a breaching party to the pair-wise mutual agreement (e.g., in a form of a payment) for not fulfilling terms, conditions, stipulations, and/or obligations under a binding contract (e.g., the pair-wise mutual agreement). FIG. 2 illustrates different federation types 250, according to one or more embodiments. In particular, FIG. 2 illustrates an intercontinental federation 202, regional federation 204, an exchange federation 206, a vendor federation 208, and a service federation 210, according to one or more embodiments.

In one or more embodiments, the intercontinental federation 202 may be a federation formed by cooperation between the networks of different continents. In other words, the intercontinental federation 202 may be formed between intercontinental networks to provide a uniform network. Also, in one or more embodiments, the network itself may be intercontinental network spanning between continents or spanning globe. In one or more embodiment, a regional federation 204 may be formed by cooperation between networks of the same region, other regions or within intercontinental network to provide services between the regional networks. In one or more embodiments, the regional networks may be based on but not limited to Metro Ethernet or local fiber.

In one or more embodiments, the exchange federation 206 may be similar to the regional federation 204. However, a Point of Presence (POP) (e.g., BPOP, HPOP) as in the exchange federation 206 may be located at a telephone exchange where Digital Subscriber Line Access Multiplexer (DSLAM) equipment is housed, a Cable Modem Termination System (CMTS) location, a WiMax base station, a WiFi hotspot or a Global System for Mobile (GSM) communications base station subsystem. In one or more embodiments, the vendor federation 208 may be formed, managed and developed by third parties. In one or more embodiments, the service federation 210 may be a formed and managed by multiple vendors. In one or more embodiments, the service federation may be based on networks which provide services, for example, cloud services. In one or more embodiments, the service federation 210 may be based on the location of the service. For example, Amazon®'s Simple Storage Service (Amazon S3™) may have data centers at Virginia, USA, and Europe.

Figure 3:
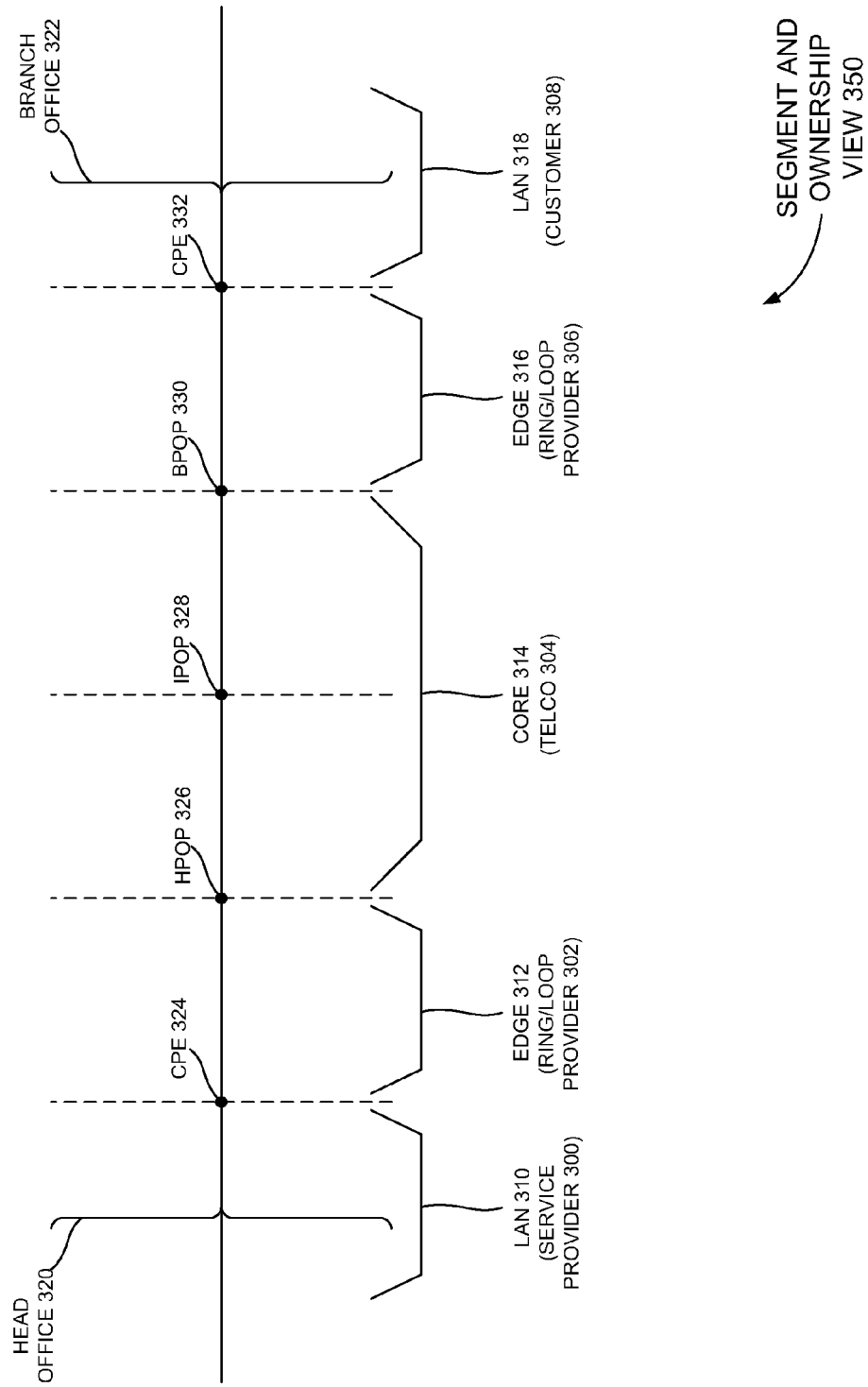
FIG. 3 is a segment and ownership view, according to one or more embodiments.

FIG. 3 is a graphical representation of a federation illustrating segments, nodes and ownership 350, according to one or more embodiments. In particular, FIG. 3 illustrates communication between a head office 320 and a branch office 322. In one or more embodiments, the communication between the head office 320 and the branch office 322 may be enabled through one or more networks, through one or more nodes and through one or more segments. In an example embodiment, the communication between the head office 320 and the branch office 322 may be enabled through nodes that include a Customer Premises Equipment (CPE) 324 (e.g., of the head office 320), a head office Point Of Presence (HPOP) 326, an intermediate POP (IPOP) 328, a branch POP (BPOP) 330, and a CPE 332 of the branch office 322.

In one or more embodiments, a communication link between each of the nodes may be called as a segment. In one or more embodiments, segment between the nodes may be provided and managed by owners thereof. In the example embodiment, a segment between by the head office node 320 and the CPE node 324 may be a Local Area Network (LAN) provided by a service provider 300 of the head office 320. A segment between the CPE node 324 and the HPOP node 326 may be an Enhanced Data rates for GSM Evolution (EDGE) network 312 provided by a ring/loop provider 302. A segment between the HPOP node 326 and the BPOP node 330 may be a core network 314 provided by a service provider 304 (e.g., Telco®). A segment between a BPOP node 330 and the CPE node 332 may be another EDGE network 316 provided by another ring/loop provider 306. A segment between the CPE node 332 and the branch node 322 may be a LAN segment provided by a service provider at customer premises 308. In the example embodiment, the service provider 300, the ring/loop provider 302, the core segment provider 304, the ring/loop provider 306 and the customer service provider 318 may be owners of respective segments mentioned above. In one or more embodiments, the service providers/owners of segment may provide a link and/or equipment to perform application acceleration as a service. Embodiments herein may describe pay for performance transit.

Figure 4:
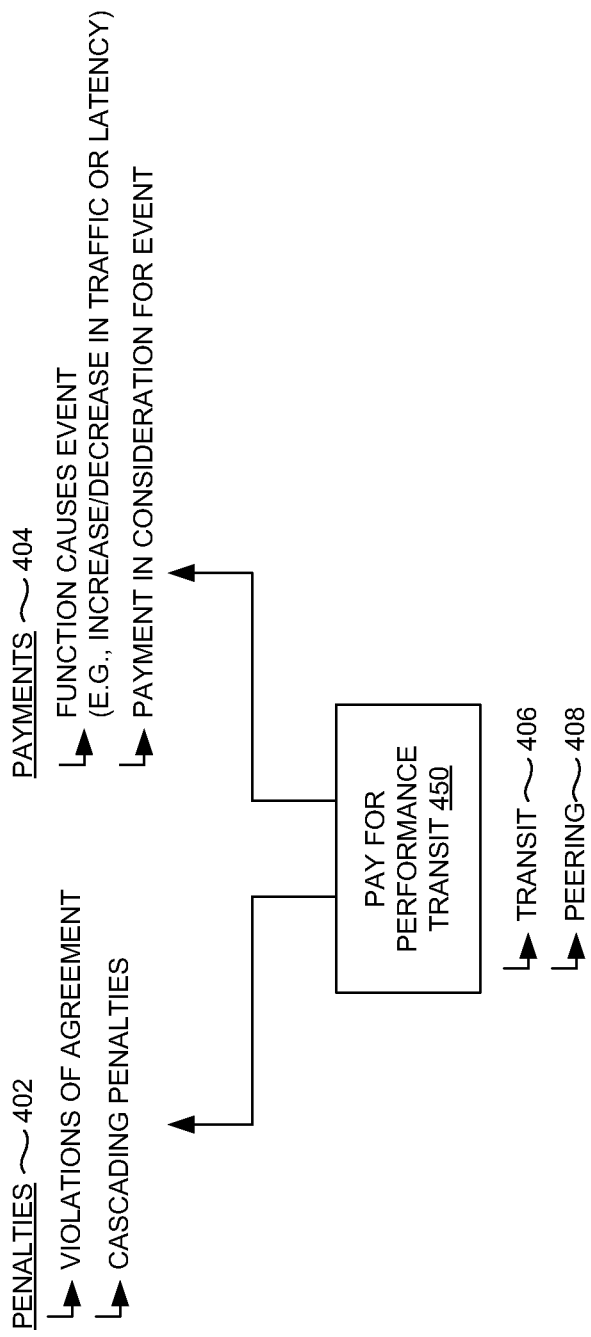
FIG. 4 illustrates components of a pay for performance transit relationship 450, according to one or more embodiments.

FIG. 4 illustrates components of a pay for performance transit relationship 450. Particularly, example penalties 402 and payments 404 are illustrated. Example penalties may include violations of an agreement and/or cascading penalties (e.g., credits) in which penalties are propagated across tiers, an autonomous system (AS) entities, and/or service providers. The autonomous system (AS) may be a collection of connected Internet Protocol (IP) routing prefixes under the control of one or more network operators that present a common, clearly defined routing policy to the Internet (e.g., RFC 1930, Section 3). The pay-for-performance transit model is a mathematical construct in which different autonomous systems (and/or individual service providers within a particular autonomous system) are provided consideration (e.g., money, currency, funds, credits, etc.) based on a variety of primary and secondary factors. Also illustrated in FIG. 4 are payments 404. Particularly, functions that cause events and payments for considerations for an event are outlined. Likewise, alternate systems defining relationships between AS entities of peering 408 and transit 406 are also illustrated in FIG. 4. Transit 406 and peering 408 is explained in detail in FIG. 7.

FIG. 5 is a relationship table 550 that describes various characteristics 502 and their related relationships. Particularly, three characteristics are illustrated in FIG. 5. It will be understood with one with ordinary skill in the art that other characteristics may be possible in alternate embodiments, and the presented characteristics are provided for illustration purposes only. Particularly described in FIG. 5 is an observation that whenever customer ownership 508 is heterogeneous (e.g. disparate) across AS systems (e.g. as described in FIG. 7), a reseller arrangement is formed. It should be noted that "customer ownership" may refer to a business relationship and goodwill created through direct interaction between a service provider (e.g., an application acceleration service provider) and a customer (e.g., a person and/or the entity who is the beneficiary of a product and/or service) that is built over time based on contracts, licenses, mutual trust, prior experience, reputation and/or faith, according to one embodiment.

Ownership Models. A reseller 510 arrangement is formed when the network/ownership 504 and the POP ownership 506 are homogeneous (e.g., controlled by the same AS) but the customer ownership 508 is different. The customer may be a client (e.g., an organization) which subscribes for application accelerated services. A modified reseller agreement (Type A) 514 arrangement is formed when the network/ownership 504 is homogeneous (e.g., controlled by the same AS) but the customer ownership 508 and the POP ownership 506 are different. A modified reseller agreement (Type B) 516 arrangement is formed when the POP ownership 506 is homogeneous (e.g., controlled by the same AS) but the customer ownership 508 and the network/ownership 504 are different. In reseller 510, modified reseller (Type A) 514, and modified reseller (Type B) 516 relationship, various embodiments of this disclosure may be particularly relevant. When the network/ownership 504, the POP ownership 506, and the customer ownership 508 are all homogeneous, a direct sales 512 arrangement may be formed, which may not require pay-per-performance transit relationships because both the customer and destination are controlled by the same AS.

Figure 6:
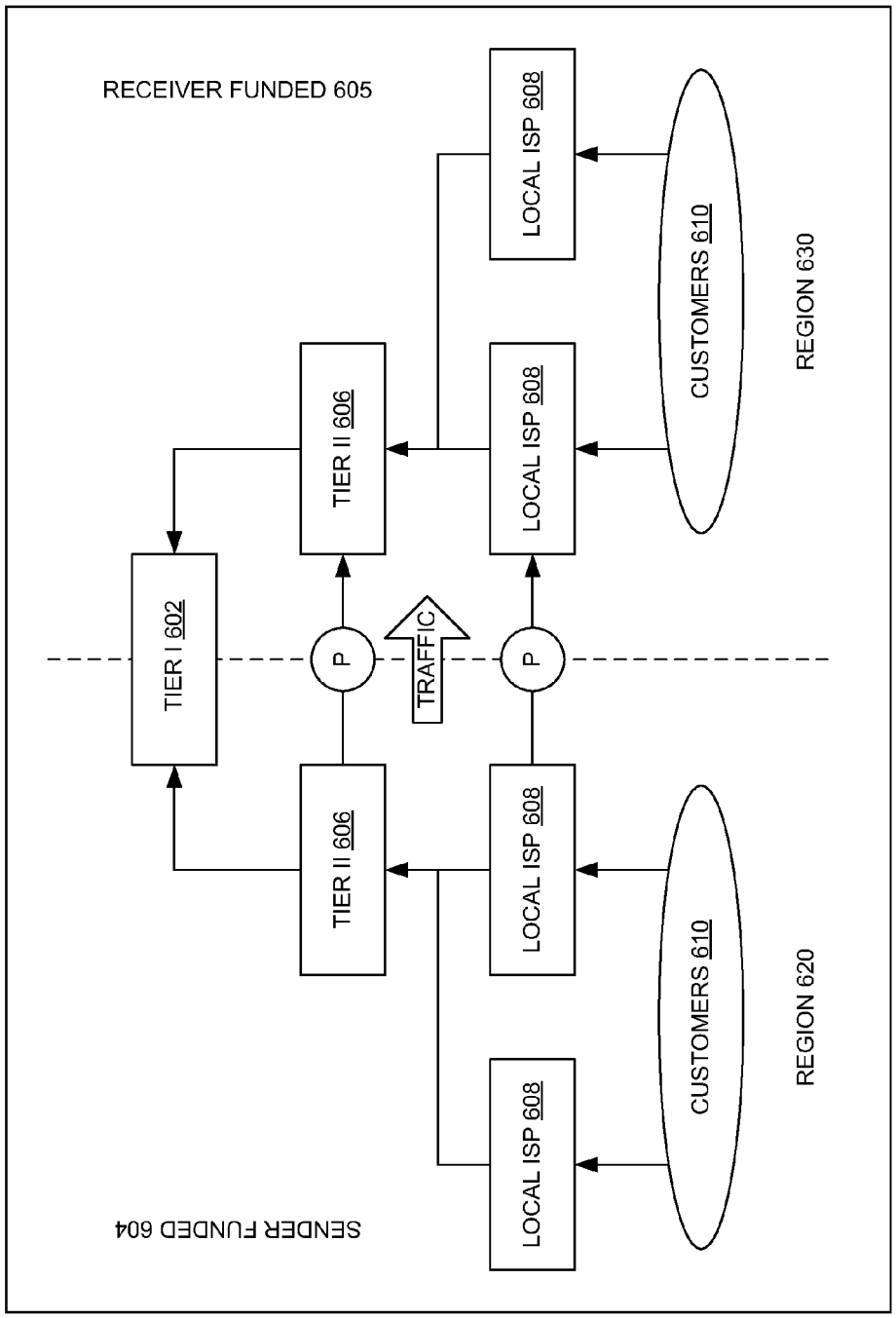
FIG. 6 illustrates a tiered approach between service providers and/or HS entities, according to one or more embodiments.

FIG. 6 illustrates a tiered approach between service providers and/or HS entities. Particularly, Tier 1 602 may represent the highest level HS service provider that has the largest, fastest, and/or most robust global network of end points and/or customers. Tier II 606 may represent mid-tier HS service providers which are less preferred than Tier I because of contractual, geographic, and/or bandwidth limitations. Local ISPs 608 may have direct relationships with customers 610 across local geographies that feed traffic through various Peering, Transit, and Pay-for-Performance transit relationships as described herein. Region 620 in FIG. 6 illustrates hierarchy at a sender funded side 604, which Region 630 illustrates a hierarchy at a receiver funded side 605. It will be understood by those with ordinary skill in the art that other hierarchies and modifications may be possible according to the various embodiments disclosed herein.

Figure 7:
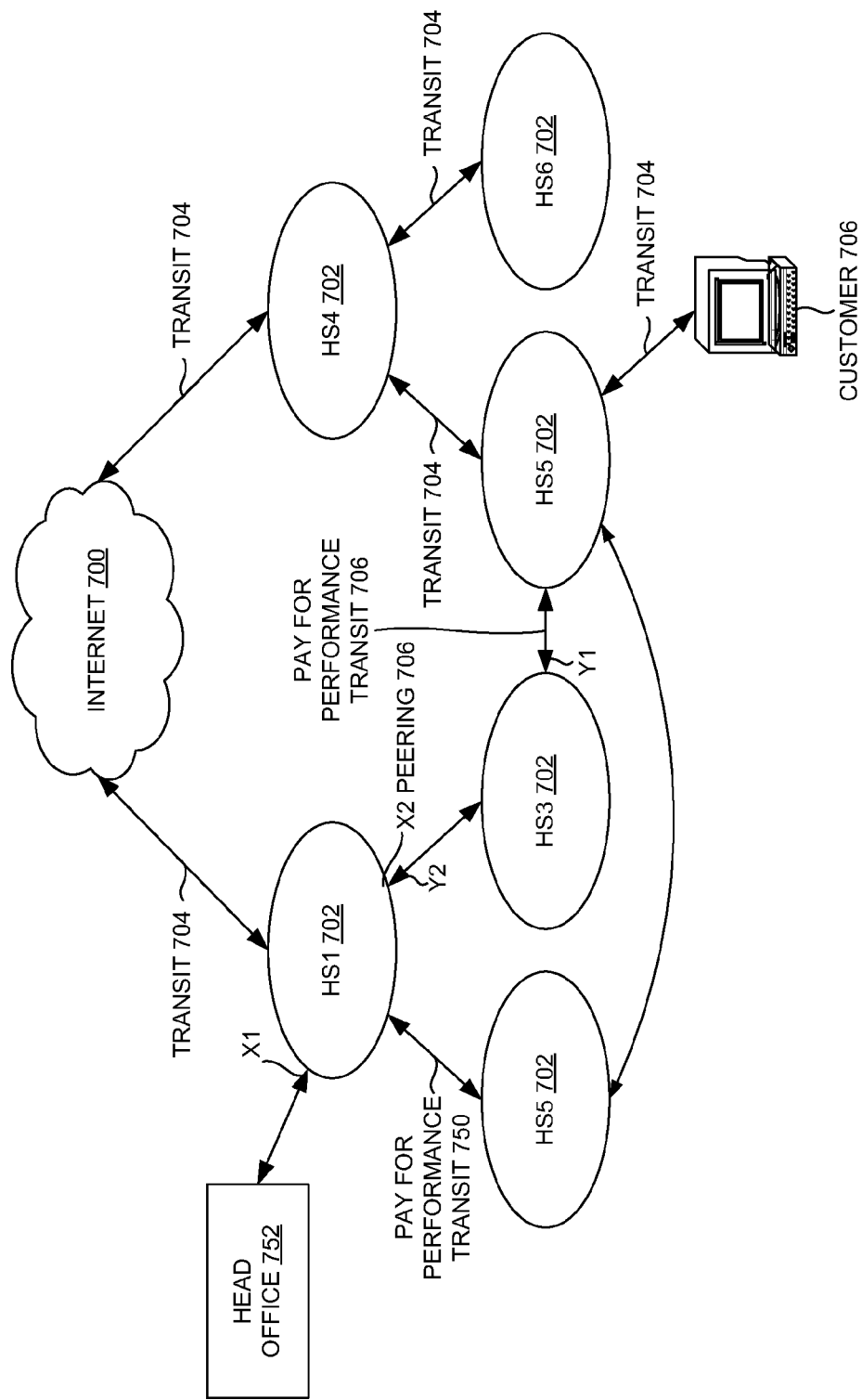
FIG. 7 is a conceptual view of components of peering and transit relationships between Heterogeneous Systems, according to one or more embodiments.

FIG. 7 is a conceptual view of components of peering and transit relationships between Heterogeneous Systems. Particularly, FIG. 7 illustrates that there are various transit 704 relationships and peering 706 relationships between heterogeneous systems 702 (e.g., intercontinental federation, regional federation, exchange federation, vendor federation, and service federation) and the Internet 700. One communication link illustrates a pay-for-performance transit 750 relationship, according to one embodiment.

The pay-for-performance 750 transit model is a mathematical construct in which different heterogeneous systems 702 (and/or individual service providers within a particular autonomous system) are provided consideration (e.g., money, currency, funds, credits, etc.) based a variety of primary and secondary factors. The first factor can be whether the particular entity (e.g., a particular autonomous system and/or individual service providers within the particular autonomous system) owns a relationship with a customer 706. Owning a relationship with the customer 706 may be defined as a personal relationship between the customer 706 and the entity such that the customer recognizes the entity as their primary point of contact for services. For example, the entity may be an Internet service provider.

In a mathematical model, revenues provided by a customer to the entity can be defined as (CR). As such, an entity owning a customer, such as HS5 in FIG. 7 may receive a revenue CR from the customer to route traffic. If the traffic were destined for a customer coupled to HS1 in FIG. 7, the HS5 may pay a standard service fee X1 for settlement for a standard service (e.g., which may be zero) provided by HS3 in FIG. 7 and/or an enhanced service fee X2 for an enhanced service provided by HS3. Also, it may be assumed that HS1 and HS5 may have a settlement free peering. As a result, the total revenue that HS5 may acquire from customer 706, in the absence of acceleration payments, may be defined by the following equation:

Total Revenue (HS5)=CR−X2−Y1

Accordingly, the total revenue for HS3 and HS1 may respectively be:

Total Revenue (HS3)=X2+Y1

Total Revenue (HS1)=0

In one or more embodiments, X1, X2, Y1, Y2 may be flow based, tunnel based, link based or flat fee per month/week/day/year. In one or more embodiments X1 & X2 may represent total bandwidth in one direction measured at the end points specified, while Y1 and Y2 may represent total bandwidth in the opposite direction at the end points specified.

Application acceleration may reduce traffic. An Acceleration function 'A' based on bandwidth reduction may be included as a factor in the value of an acceleration service. The function 'A' may also be used to denote security and external services defined in the service federation. In some models, HS3 may not serve as a pass through collections entity for HS1. In this model, HS3 would pay pass through the cost of service from HS1 (e.g., Y1+Y2) to HS5 after collecting revenues from HS1. As described above, in one or more embodiments, X1, Y1, X2, Y2 may represent total bandwidth in a particular direction measured at certain points within the control of the HS1 or HS3. In this case, X1−X2 is the bandwidth savings as a result of the acceleration service delivered by HS1 for head office 752, and Y1−Y2 is the bandwidth savings as a result of the acceleration service delivered by HS3. In another embodiment, X2 may represent the latency without acceleration and X1 with acceleration in a particular direction, and the savings would be captured as the difference between the two delivered by HS1. In the same vein, Y2−Y1 would represent the latency improvement with the acceleration function delivered by HS3. In both the latency and bandwidth saving embodiments, the actual revenue to HS1 and HS3 as paid by HS5 is derived as a function, A, of the differences in bandwidth or latency. In such a model, the total debits that HS5 may incur may be defined by the following equation:

Total Debit (HS5)=CR−A(X1−X2)−A(Y1−Y2)

Accordingly, the total debit for HS3 and HS1 may respectively be:

Total Debit (HS3)=A(Y1−Y2)

Total Debit (HS1)=A(X1−X2)

Similar to the definitions used in calculating revenues, in one or more embodiments, X1, X2, Y1, Y2 may be flow based, tunnel based, link based or flat fee per month/week/day/year. In one or more embodiments X1 & X2 may represent total bandwidth in one direction measured at the end points specified, while Y1 and Y2 may represent total bandwidth in the opposite direction at the end points specified.

The acceleration function 'A' in the debit equation may be based on bandwidth reduction and may be included as a factor in the value of an acceleration service. The function 'A' may also be used to denote security and external services defined in the service federation. Examples of the standard service denoted by "A" may include deceleration of data, compression, un-compression, billing, management functions, visibility, prefetching, caching, security, multiplexing, pipelining, persistent connections, etc.). In contrast, examples of the enhanced service may include external services in the service federation.

Figure 8:
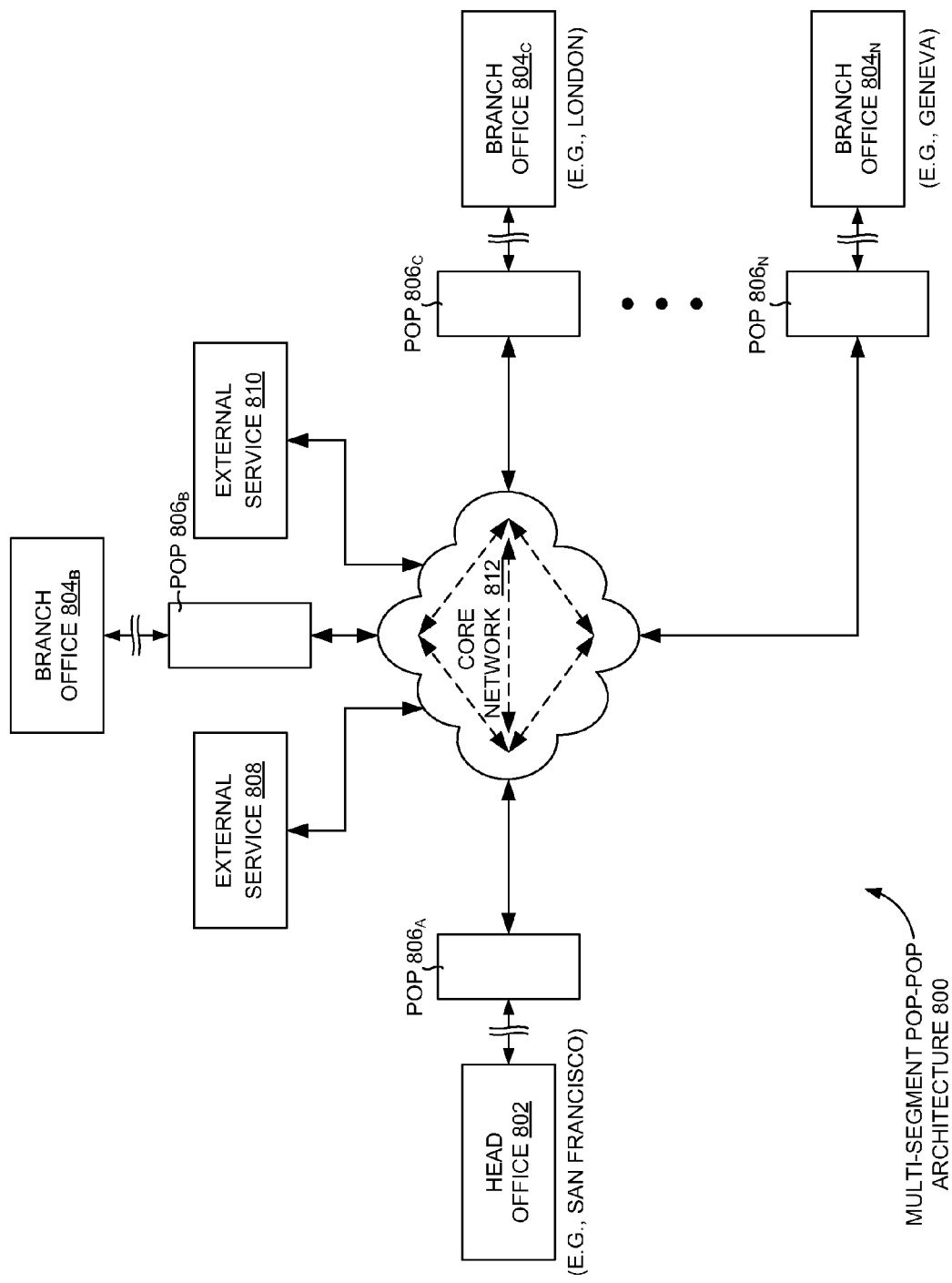
FIG. 8 is a system view of a multi-segment Point of Presence (POP)-POP architecture, according to one or more embodiments.

FIG. 8 shows a multi-segment Point of Presence (POP)-POP architecture 800, according to one or more embodiments. In one or more embodiments, POPs $806_{A-N}$ may be installed at various geographical locations (e.g., around a country, around the world, etc.). In one or more embodiments, POPs $806_{A-N}$ may be communicatively coupled to each other directly or indirectly through a public network or a private network. In particular, in one or more embodiments, POPs $806_{A-N}$ may be installed close to the location of the customer premises. For example, there may be a head office 802 (or a number of head offices 802) of a business entity in San Francisco and branch offices $804_{B-N}$ of the business entity in London and Geneva, where POPs $806_{A-N}$ may be installed. In one or more embodiments, the head office 802 and the branch offices $804_{B-N}$ may communicate with each other through a core network 812, which may include a private network and/or a public network. In one or more embodiments, the core network 812 may use Wide Area Network (WAN)/Internet for communication with/between POPs $806_{A-N}$ and with the external services (808, 810) (e.g., service providers). In one or more embodiments, each segment may be enabled using service provider for each segment.

In the example embodiment, if the Geneva office requires transmission of large data to the London office, then the Geneva office may directly communicate the data to the London office without going through the head office 802 in San Francisco. The corresponding POP of the Geneva office may intelligently identify the end destination as London to enable direct communication of the data to the corresponding London POP. In one or more embodiments, corresponding POP $806_{A-N}$ locations closest to the branch offices $804_{B-N}$ or the head office 802 may be determined before traffic is sent (e.g., pre-provisioned) or when traffic is sent (e.g., dynamic). In one or more embodiments, intermediate POPs (e.g., $806_B$) may also be determined through pre-provisioning or dynamic techniques. In one or more embodiments, it is to be noted that the business entity may communicate data through the head office 802 also.

In one or more embodiments, POPs $806_{A-N}$ may form a part of a cloud or an interconnection of networks through which communication occurs. In one or more embodiments, POPs $806_{A-N}$ may be access points to the Internet. In one or more embodiments, each of the POPs $806_{A-N}$ may be physical locations that house servers, routers, ATM switches and digital/analog call aggregators. In one or more embodiments, each POP $806_{A-N}$ may either be part of the facilities of a telecommunications provider that an Internet Service Provider (ISP) rents or a location separate from the telecommunications provider. In one or more embodiments, ISPs may have multiple POPs, sometimes numbering in the thousands. In one or more embodiments, POPs $806_{A-N}$ may also be located at Internet exchange points and co-location centers.

In one or more embodiments, a segment may be a communication link between POPs $806_{A-N}$ or a communication link between any of the nodes. For example, in one or more embodiments, the segment may be a T1 line, Digital Subscriber Line (DSL), cable, Metro Ethernet, MPLS, Internet, or private point-point leased line. In one or more embodiments, policies may be assigned per segment. In one or more embodiments, POPs $806_{A-N}$ may be communicatively coupled to each other through a transport network. Since the POPs $806_{A-N}$ may be communicatively coupled to each other directly/indirectly, in one or more embodiments, there may be multiple segments. Therefore, in one or more embodiments, the architecture of the system may be a multi-segment based.

In one or more embodiments, the multi-segment POP-POP architecture 800 may be based on layer 3 (network layer)/layer 4 (transport layer). In one or more embodiments, the multi-segment POP-POP architecture 800 may enable each segment to have different acceleration and routing policies based on acceleration cost and congestion. In addition, in one or more embodiments, a system embodying the multi-segment POP-POP architecture 800 may include Transmission Control Protocol (TCP) proxies (e.g., at layer 4) at each segment.

In one or more embodiments, ACK (acknowledge) packet messages of Transmission Control Protocol (TCP) proxies may be acknowledged by the immediately following segment, which may significantly reduce latency, congestion issues and packet loss. In one or more embodiments, each segment may be configured with different TCP policies (e.g., windows scaling, Selective ACKs (SACKs), Additive Increase/Multiplicative Decrease (AIMD), etc.) based on parameters such as speed of link, congestion, peering points and customer preference. In addition, in one or more embodiments, the TCP policies may be controlled per protocol and per client, and may be changed at runtime based on traffic conditions at each segment.

In one or more embodiments, FIG. 8 may also be seen as illustrating application acceleration as a service. In one or more embodiments, POPs $806_{A-N}$ may be installed at a location closest to the external services (808, 810) (e.g., service providers), the head office 802, and/or the branch offices $804_{B-N}$. In one or more embodiments, POPs $806_{A-N}$ may be communicatively coupled to each other as discussed above. In one or more embodiments, due to the presence of the multiple POPs $806_{A-N}$, traffic may be intelligently diverted to a destination POP. In one or more embodiments, the route between POPs $806_{A-N}$ may be determined before sending traffic (e.g., pre-provisioned) or determined after sending traffic (e.g., dynamic). In one or more embodiments, the segments formed may have the application acceleration capabilities for communicating data without unwanted delay or packet loss. In one or more embodiments, in addition to application acceleration capabilities, the segments formed may have the capabilities not limited to redundancy removal, prefetching, pipelining, caching, multiplexing, persistent connection, load balancing, offloading, etc. As a result, in one or more embodiments, there may be significant improvement in bandwidth savings and lower latency. Other services include visibility and security services.

External Services. In an example embodiment, branch office $804_B$ may require communication with the external services 808 (e.g., Software as a Service (SAAS) applications such as Salesforce.com® and/or Web filtering such as Websense®). Here, instead of sending traffic to POP $806_A$ of the head office 802 for services, POP $806_C$ can direct the traffic associated with the external services 808 directly to POP $806_B$. As a result, the time for the data communication may be significantly reduced. In another example embodiment, when the head office 802 is required to communicate with external services 808 (e.g., Amazon Web Services™), the communication may be channeled directly to the external services 808 by POPs $806_{A-N}$ instead of directing the communication through the Internet. Therefore, in this embodiment, utilizing POPs $806_{A-N}$ instead of directing the communication through the Internet would substantially improve latency and reduce bandwidth costs.

High Availability. In one or more embodiments, the system embodying the multi-segment POP-POP architecture 800 may provide for high availability (e.g., end-to-end connectivity). In one or more embodiments, in the event of a POP failure (e.g., due to network congestion, service unavailability, segment policy, etc.), the system may switch the coupling to a different POP. In one or more embodiments, when there is an intermediate POP failure, an alternate route may be determined and the data may be re-routed. In one or more embodiments, the system may provide an out-of-band protocol communicating the final destination address used for controlling the re-routing of the compressed/encrypted payload in the event of POP failure.

High Availability. In an example embodiment, the head office 802 in FIG. 8 may require communication with external services 808. Here, if the communication between POP $806_A$ and POP $806_B$ fails, then the communication may be routed via POP $806_C$. In the event of a communication failure between POP $806_A$ and POP $806_C$, communication may be established between the head office 802 and the external services 808 by routing through POP $806_N$ to POP $806_C$.

In another example embodiment, the set of POPs $806_{A-N}$ may be shared by more than one licensed entity of the application acceleration service. For example, the external services (808, 810) may not be a part of the business entity. However, the external services (808, 810) may be clients of the business entity or service providers to the business entity. In one or more embodiments, external services (808, 810) discussed herein may be licensed entities of the application acceleration service. In one or more embodiments, therefore, external services (808, 810) may be entitled to use POPs $806_{A-N}$ closest thereof. As a result, in one or more embodiments, the licensed entities may leverage both a shared software and a shared hardware infrastructure of an application acceleration service provider. Also, the POPs $806_{A-N}$ may be owned by different business entities. It may be noted that the licensed entities may also have head offices and branch offices. The embodiments described herein may not be limited to hub-spoke configurations (e.g., the head office 802 serving as a hub and the branch offices $804_{B-N}$ configured as a spoke). It should be noted that the embodiments described herein may also support hub-hub (e.g., the head office 802 requesting for services from an external service provider) and spoke-spoke configurations (e.g., services among the branch offices $804_{B-N}$). Combinations of hub-hub, spoke-spoke, and hub-spoke may be called a mesh network. This application applies to all embodiments of mesh networks that request one or more providers to complete the acceleration service.

Ownership of POPs & Segments. In one or more embodiments, a heterogeneous network may be a loose composition of autonomous nodes (e.g., servers, storage, networks in POPs $806_{A-N}$, network equipments) spread across different administrative domains. In one or more embodiments, these administrative domains may be independent for-profit entities. In one or more embodiments, any service that spans these heterogeneous entities may need to deal with Service Level Agreements (SLAs) and contracts. In one or more embodiments, an entire network system (e.g., Internet, a network system embodying the multi-segment POP-POP architecture 800) may not be owned by a single provider. In one or more embodiments, the administrative domains may control various functions within a network system. In one or more embodiments, the customer may be owned by an administrative domain, and data may be transmitted through the customer premises. In one or more embodiments, data may be transmitted through a third-party location and/or may utilize third-party infrastructure. In one or more embodiments, as discussed above, the network system may be a union of independent for-profit entity ownerships.

In one or more embodiments, in a multi-segment POP-POP architecture akin to multi-segment POP-POP architecture 800, segments may perform different functions, as discussed above, and, hence, use different resources. FIG. 9 shows an example table detailing ownerships in a multi-segment POP-POP architecture analogous to the multi-segment POP-POP architecture 800, according to one or more embodiments. In one or more embodiments, an optional Customer Premises Equipment (CPE) (e.g., an Aryaka™ CPE) may be installed at a branch office (e.g., branch office $804_{B-N}$) and/or the head office (e.g., head office 802) for performing Advanced Redundancy Removal™ (ARR). It should be noted that Aryaka™ and Advanced Redundancy Removal™ are pending U.S. federal trademarks of Aryaka Networks, Inc., and all rights are reserved to these names.

Security. In one or more embodiments, the optional CPE may be configured to perform secure transportation of data and to communicate the secured data (e.g., a collaborative document accessed and/or simultaneously modified by a number of different users at the branch office (e.g., branch office $804_{B-N}$) on a regular basis, an enterprise application including the collaborative document) between client devices at the branch offices (e.g., branch offices $804_{B-N}$) and the head office(s) (e.g., head office(s) 802) with optional intervening firewalls through an Internet Protocol Security (IPsec) tunnel, a Generic Routing Encapsulation (GRE) tunnel, virtual Local Area Networks (vLANs), and/or Multiprotocol Label Switching (MPLS) labels using Internet Protocol (IP) headers. Here, the enterprise application may be an internal application of a business entity. In addition to the optional CPE, in one or more embodiments, an optional branch router (not shown) and an optional head-office router (not shown) may be used to perform the ARR, generation of secure transport data and communication of secure transport data over secure channels. In one or more embodiments, use of the optional CPE may enable the resolution of bandwidth limitation in the first/last mile.

In one or more embodiments, the first mile may be a link between the closest POP location to a branch office (e.g., branch office $804_{B-N}$) and the branch office (e.g., branch office $804_{B-N}$). In one or more embodiments, the last mile may be a link between the closest POP location (e.g., POP $806_A$) to the head office (e.g., head office 802) and the head office (e.g., head office 802). In one or more embodiments, the optional CPE may reduce communication time of a collaborative document, a computed document (e.g., a document generated at run-time for a user) and/or a static document (e.g., copy of a content data that may be frequently accessed by the branch offices (e.g., branch offices $804_{B-N}$)) in the link between the closest POP location (e.g., POPs $806_{B-N}$) to the branch office (e.g., branch office $804_{B-N}$) and the branch office (e.g., branch office $804_{B-N}$) by resolving bandwidth limitation in the first mile.

Functions of Acceleration as a Service. In one or more embodiments, the use of the optional CPE may enable faster data communication in the branch office (e.g., branch office $804_{B-N}$) or the head office (e.g., head office 802), when the communication line has a low bandwidth. However, in one or more embodiments, when the branch office (e.g., branch office $804_{B-N}$) and/or the head office (e.g., head office 802) have sufficient bandwidth for data communication, the use of the optional CPE may not be required. Here, in one or more embodiments, POPs $806_{A-N}$ and the optional CPE may have storage capabilities for performing ARR in communicating data. In one or more embodiments, the storage capabilities (e.g., flash memory, hard drive, flash drive, solid state memory etc.) in the optional CPE may enable reduction of the amount of data flow through ARR. In one or more embodiments, protocol proxies (e.g., CIFS, MAPI, HTTP/HTTPS, FTP, PRINT, RTMP, RTP, Oracle etc.) may be implemented within POPs $806_{A-N}$ and/or the optional CPE.

In one or more embodiments, the optional storage in POPs $806_{A-N}$ may be shared. In one or more embodiments, ARR may be a class of techniques utilized to remove duplicate information between senders and receivers by capturing histories of data stream, and retaining these histories beyond the life of connections. In one or more embodiments, POPs $806_{A-N}$ may be shared among different clients and different branches. In addition, in one or more embodiments, engines in POPs $806_{A-N}$ may be shared by different clients.

In one or more embodiments, the use of POPs $806_{A-N}$ may eliminate the requirement of having intelligent synchronized WAN optimization equipment for solving latency and bandwidth at the head office (e.g., head office 802) and the branch office (e.g., branch office $804_{B-N}$) ends. In one or more embodiments, use of MPLS at the core network 812 may be eliminated because POPs $806_{A-N}$ may speed up the data communication without any delay and/or loss of packets. In one or more embodiments, therefore, applications such as basic office documents (e.g., spreadsheets, word processing files), web applications (e.g., detail locators, catalogs, store locators) and Internet applications may be accelerated through the acceleration service. In one or more embodiments, large enterprise applications may also be accelerated using POPs $806_{A-N}$. In one or more embodiments, acceleration of data may be possible as POPs $806_{A-N}$ are intelligently designed to analyze the destination of a packet, and to communicate the packet to the destination without compromising and/or modifying private networks of clients.

In an example embodiment, as shown in FIG. 9, a branch-CPE1 segment may utilize an internal network owned by company A (e.g., a license peering). CPE1 may be the CPE installed at the branch office (e.g., branch office $804_{B-N}$). In other words, the physical asset, e.g., CPE1, may be owned by company A and/or a customer of the acceleration service. In the case of the CPE1-BPOP segment, the branch POP (BPOP) (e.g., POP $806_{B-N}$ associated with a branch office $804_{B-N}$) may be owned by a provider 1. The provider 1 may own the network at the requisite location or lease the network from a third-party. The provider 1 may also license required network software from company A.

In the case of the BPOP-HPOP segment, the Head POP (HPOP) (e.g., POP $806_A$ associated with the head office 802) may be owned by a provider 2. The provider 2 may own the network at the requisite location or lease the network from a third-party. The provider 2 may, again, also license required network software from company A. In the case of the HPOP-CPE2 segment, a provider 3 may own the network at the requisite location or lease the network from a third-party. CPE2 may be the CPE installed at the head office (e.g., head office 802). The physical asset, e.g., CPE2, may, again, be owned by company A or a customer of the acceleration service. The CPE2-Head segment may utilize the internal network owned by company A. Here, Head refers to the head office (e.g., head office 802).

For example, the CPE1-BPOP segment may do ARR, and may use an independent resource (e.g., Adobe®'s Flash®) heavily for the purpose. The CPE1-BPOP segment may utilize the leased network lightly, and may leverage the Intellectual Property (IP) of company A heavily. The BPOP-HPOP segment may be of longer distance, and may heavily use the leased network. The BPOP-HPOP segment may have an optional Intermediate POP (IPOP) at an intermediate location. There may be medium use of the IP of company A in the BPOP-HPOP segment, and the HPOP-CPE2 segment. Thus, there may be four contracted parties that may need to be paid for services, viz. company A, provider 1, provider 2, and provider 3.

In the example discussed in FIG. 9, requisite network software provided by company A may reside at every node of the network system including the POPs (e.g., BPOP, HPOP, IPOP), CPE1, and CPE2. In one or more embodiments, acceleration may pose problems especially when POPs (e.g., POPs $806_{A-N}$) that perform the acceleration cross service provider boundaries. The aforementioned problem may be common when services of local loop providers, who may own BPOP at a local loop switching station, may be utilized by provider 1 and provider 3. Here, the local loop providers may license the requisite network software of company A. Also, provider 2 may be a long-haul network provider, especially considering the possible long distance of the BPOP-HPOP segment. In one or more embodiments, provider 1 may provide better user experience, and lower bandwidth on the long-haul network.

In the example discussed in FIG. 9, third-party providers may be contracted to company A, provider 1, provider 2 and/or provider 3 to provide external services (e.g., external services 808, 810). A third-party provider may also be a direct provider to a customer. Therefore, in one or more embodiments, each of the heterogeneous entities may deal in terms of SLAs and contracts. In one or more embodiments, one heterogeneous entity may be a customer and another heterogeneous entity may be a service provider in an SLA.

Violations. In one or more embodiments, violations of SLA may occur in a segment, which, in turn, may cause a cascade of violations. In the example described in FIG. 9, a failure of acceleration in the CPE1-BPOP segment may cause more traffic in the BPOP-HPOP segment, resulting in unplanned congestion in the BPOP-HPOP segment and unanticipated bandwidth charges. In one or more embodiments, acceleration may reduce traffic in a segment because caching may be associated with the acceleration. In the aforementioned example, if more traffic may be transmitted to the BPOP-HPOP segment due to the failure of acceleration in the CPE1-BPOP segment, provider 2 is not at fault. Here, it may be necessary to pay provider 2 in the violation scenario. The payment may have to come out of provider 1 for the failure of acceleration in the CPE1-BPOP segment. Hence, in one or more embodiments, a debit-credit mechanism may be required to handle penalties. Debit-credit may be first used for handing peering payments as explained in FIG. 7.

In one or more embodiments, when the acceleration governed by a service level agreement (SLA) is violated, a converse effect of actually increasing traffic in a network may occur. It should be noted that a service level "agreement" may relate to contracts between entities (e.g., corporations, nations, etc.) which control, have dominion over, and/or own network access between a head office and a branch office in the heterogeneous network, according to one embodiment. The service level agreement may govern rights to use, prioritize, and/or access network services of competitors and/or peers to offload routing of traffic. When the service level agreement is settlement free, entities may act in self-interest and/or may choose to retain bandwidth availability on their own networks at the expense of partner networks in a manner that is consistent with the SLA, but which parasitically affects performance of the network.

In contrast, a pay-per-performance peering relationship of the service level agreement may provide more equitable accounting between entities because entities may be charged for services that they actually use and are therefore can be financially incentivized to minimize wasted bandwidth even when that bandwidth is on partner networks, according to one embodiment. Such a relationship may be applicable between combinations of different entities of the heterogeneous computer network. The heterogeneous computer network may include of POPs and links owned and/or controlled by entity networks. The entities may have a pay-per-performance peering relationship between themselves. A customer may be owned by one of the entities in the heterogeneous network. The customer may have a branch office and head office and may use the heterogeneous network to communicate between the branch office and the head office, according to one embodiment.

In some embodiments, the service level agreement may be a negotiated agreement between two entities (e.g., corporations and/or nations who control, have dominion over, and/or own network access between a head office and a branch office). The service level agreement may record a common understanding about services, priorities, responsibilities, guarantees, and/or warranties. Each area of service scope may have a "level of service" defined. The service level agreement may specify the levels of availability, serviceability, performance, operation, and/or other attributes of the service, such as billing.

The "level of service" can also be specified as "target" and "minimum," which allows entities to be informed what to expect (the minimum), whilst providing a measurable (average) target value that shows the level of organization performance. In some contracts, penalties may be agreed upon in the case of non-compliance of the service level agreement. In case of acceleration governed by the service level agreement, the provider is paid for bandwidth saved or latency mitigated. However, if the bandwidth is not saved or latency is not mitigated, the contract is breached and more traffic may be sent.

In one or more embodiments, if the acceleration is perfect, no traffic may be transmitted to the network/segment and rather the traffic may be provided through a local cache at the closest POP location to where demand is present. For example, if offices (e.g., more likely branch office) have a cache (e.g., local cache) which has most of the contents required, there may very less traffic on a segment owing to service obtained from the local cache itself.

In one or more embodiments, as acceleration may lead to lower bandwidth and, hence, the customer may have a substantially better user experience, the lower potential revenue from the bandwidth needs to be offset by higher acceleration service charges. In one or more embodiments, because resources are provisioned during perfect acceleration, the corresponding provider may need to be compensated even when there is no traffic transmitted through the network as represented by the acceleration function A (e.g., standard function).

Insertion Model. In one or more embodiments, an insertion model may be a mechanism chosen by the customer to connect to POPs (e.g., POPs $806_{A-N}$) and provide sufficient information to route packets in a network. In one or more embodiments, the insertion model may connect to the POP locations in the computer network based on obtaining network connectivity from a customer premises, a method of securing the network connection, and a method of routing between the POPs. In one or more embodiments, insertion model may be GRE based, Network Address Translation (NAT) based, MPLS based, WLAN, or WiMax based, depending on how the provider is used. For example, in FIG. 9, provider 1 and provider 3 may have different insertion models. Here, a segment may start off with a T1 line at provider 1 and may end in a Metro Ethernet link at provider 3. Segment provided by Provider 2 may be internet, MPLS, point-point line, or carrier Ethernet.

Tracking. In one or more embodiments, a heterogeneous network may occur through a flow (e.g., packet flow from source to destination), payment settlement may need to be per flow or per tunnel, per link, or based on resources used. In one or more embodiments, the flow may originate on any domain, transport through any domain, and terminate on any domain. For example, with reference to FIG. 9, the flow may originate on a domain under the purview of provider 1, transport through a domain under the purview of provider 2, and terminate on a domain under the purview of provider 3. Here, although all domains under the purview of provider 1, provider 2, and provider 3 are involved in the acceleration, the domains (e.g., segments) may perform different functions.

Figure 10:
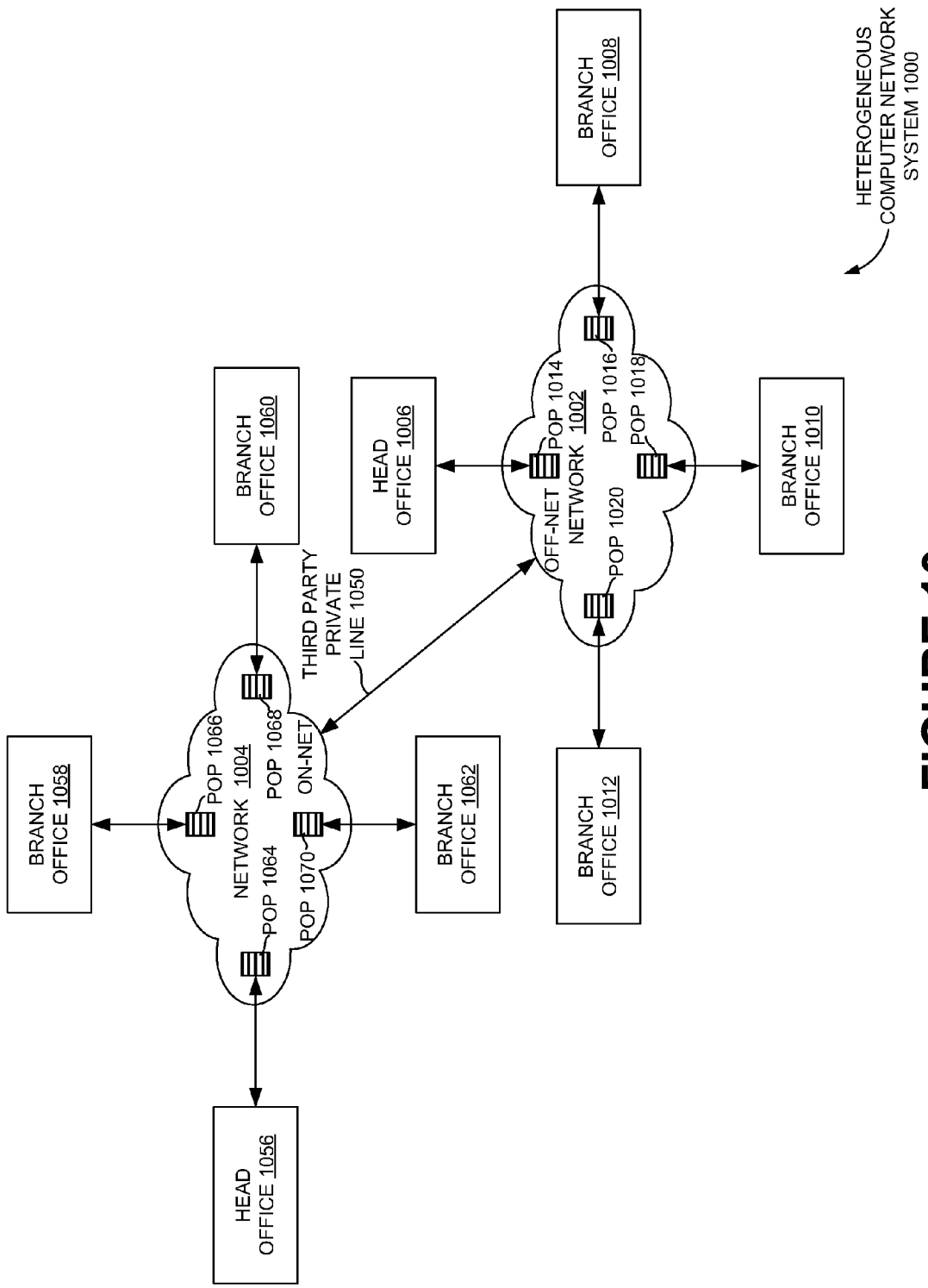
FIG. 10 is a schematic view of an intercontinental heterogeneous network, according to one or more embodiments.

Intercontinental. In one or more embodiments, heterogeneous networks may be classified based on architectures thereof. FIG. 10 shows an intercontinental heterogeneous network 1000, according to one or more embodiments. In one or more embodiments, the intercontinental heterogeneous network 1000 may include networks owned by company A (e.g., network 1002) and company B (e.g., network 1004). In one or more embodiments, each network (1002, 1004) may include a head office (1006, 1056) and a number of branch offices (1008, 1010, 1012 for company A and 1058, 1060, 1062 for company B). In one or more embodiments, POPs may be associated with the head offices (1014 for company A and 1064 for company B) and branch offices (1016, 1018, 1020 for company A and 1066, 1068, 1070 for company B), as shown in FIG. 10. In one or more embodiments, the head offices (1006, 1056) and the branch offices (1008, 1010, 1012, 1058, 1060, 1062) may be located in different continents across the world. For example, head office 1006 of company A may be located at Washington D.C. (USA), and the branch offices (1008, 1010, 1012) of company A may be located at Bangalore (India), Beijing (China), and San Francisco (USA) respectively. The head office 1056 of company B may be located at Atlanta (USA), and the branch offices (1058, 1060, 1062) of company B may be located at Cincinnati (USA), London (Europe), and Geneva (Europe).

In one or more embodiments, in the intercontinental heterogeneous network 1000, the two intercontinental networks (1002, 1004) may be fused together to present a uniform network. In one or more embodiments, the intercontinental networks (1002, 1004) may have different coverage, and a union of coverage may be obtained by the fusion thereof. In one or more embodiments, specific flows per customer may be wholly executed in the network owned by company A (e.g., network 1002), the network owned by company B (e.g., network 1004) or both. In one or more embodiments, in extreme cases, packets may exit a provider network (e.g., network 1004) and may re-enter the network (e.g., network 1004) again at the same POP or a different POP. In one or more embodiments, intercontinental heterogeneous network 100 may occur when the providers (e.g., company A, company B) have the capabilities to own POPs and networks (e.g., network 1002, network 1004) that span continents.

In one or more embodiments, as shown in FIG. 10, network 1002 and network 1004 may be coupled through a third-party private line 1050. In one or more embodiments, the third-party private line 1050 may not have the acceleration services. In the example embodiment of FIG. 10, company B may be a long-distance carrier for customers in the region of coverage thereof (e.g., "On-Net" as in FIG. 10), and long-distance service for customers in the region of coverage of company A may be provided by a third-party ("Off-Net" as in FIG. 10). In one or more embodiments, network 1002 and network 1004 may be coupled through another intercontinental network 1050.

Figure 11:
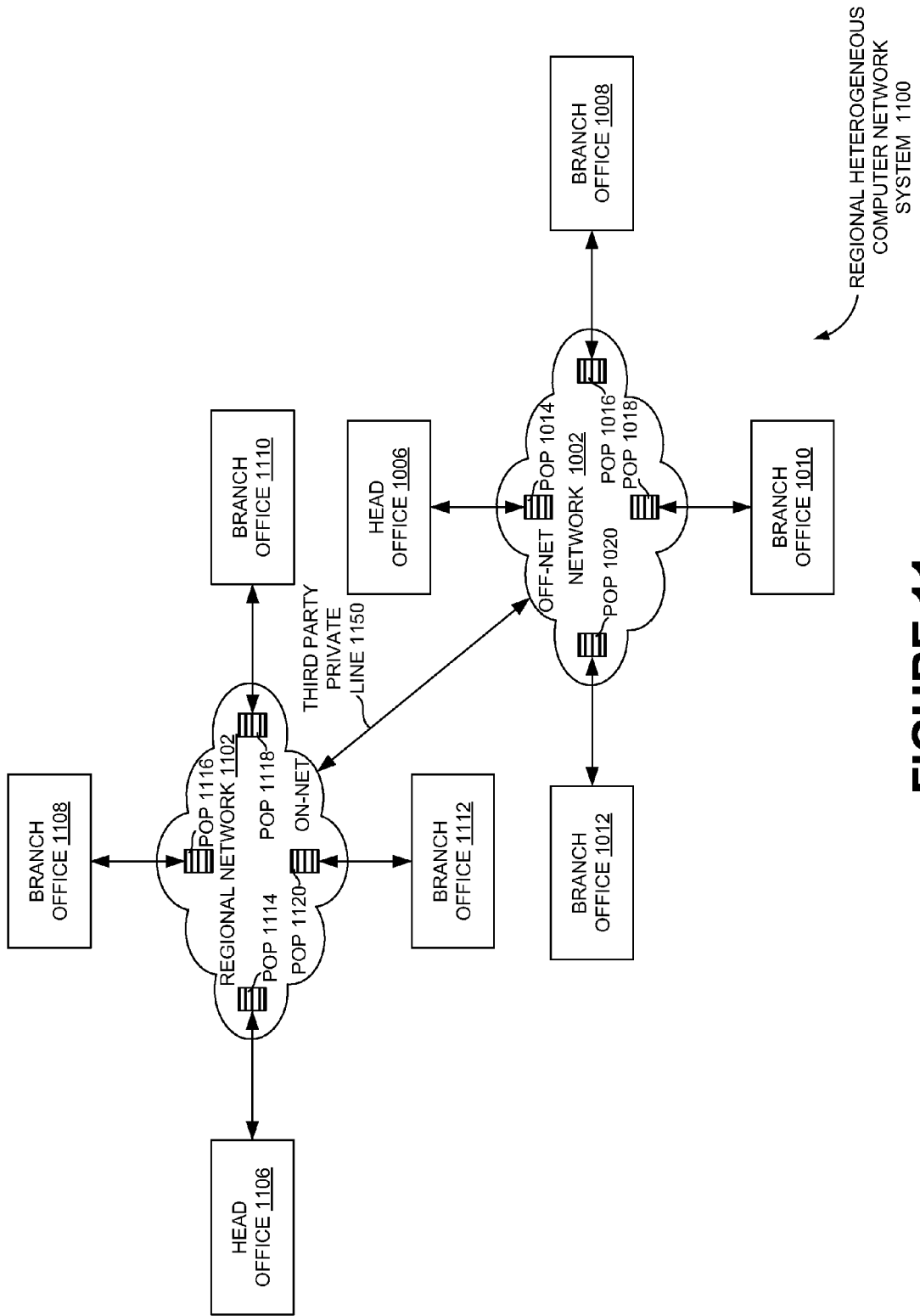
FIG. 11 is a schematic view of a regional heterogeneous network, according to one or more embodiments.

Regional Federation. FIG. 11 shows a regional heterogeneous network 1100, according to one or more embodiments. In one or more embodiments, a regional network 1102 may cooperate with other regional or intercontinental (e.g., network 1002) networks to form a uniform network. In one or more embodiments, the regional network 1102 may be Metro Ethernet based or local fiber based. In one or more embodiments, the regional network 1102 may include a head office 1106 and a number of branch offices (e.g., 1108, 1110, 1112), as shown in FIG. 11. In one or more embodiments, POPs may be associated with the head office (1114) and the branch offices (1116, 1118, 1120). In one or more embodiments, the regional network provider may only have a regional presence. Considering a Texas region network provider as an example, the head office 1106 may be located at Austin (USA), and the branch offices (1116, 1118, 1120) may be located at Houston (USA), Dallas (USA), and San Antonio (USA) respectively, as shown in FIG. 11.

The network 1002 with which the regional network 1102 forms a union is exactly as described in FIG. 10 and, therefore, no further explanation is required as to the constituents thereof. Again, as in FIG. 10, the regional network 1102 is marked "On-Net" and network 1002 is marked "Off-Net," and a private-party line 1150 may bridge regional network 1102 and network 1002. In one or more embodiments, the regional heterogeneous network 1100 may offer a different value proposition to the service provider that is not realized by the intercontinental heterogeneous network 1000. In one or more embodiments, the regional network provider may usually participate only in the local loop section of a long-distance leased-line contract. In one or more embodiments, the percentage monies paid to a regional network provider may typically be small. In one or more embodiments, by way of the regional network provider becoming a regional acceleration provider tied to the regional heterogeneous network 1100, the regional network provider may migrate to higher margins, larger contract values, and longer contracts. For the same purpose, the regional network provider may use vLANs in conjunction with Metro Ethernet.

For example, the regional network provider may communicate with an intercontinental network of company B (see FIG. 10) through a private party link 1050 to get an MPLS network on one of the locations thereof. From one of those locations, a customer may be connected to another location across continents.

Exchange Federation. In one or more embodiments, an exchange heterogeneous network may be a variant of the regional heterogeneous network 1100. In an example embodiment, a POP (e.g., BPOP, HPOP) may be located at a telephone exchange where Digital Subscriber Line Access Multiplexer (DSLAM) equipment is housed, a Cable Modem Termination System (CMTS) location, a WiMax base station, a WiFi hotspot or a Global System for Mobile (GSM) communications base station subsystem. In the example embodiment, acceleration may be performed inside DSLAM equipment. The DSLAM equipment may provide Digital Subscriber Line (DSL) access. Here, one end of the DSL line may have a modem and the other end may be DSLAM based. The DSLAM equipment may be in the premises of the provider.

Value to DSL Provider. FIG. 12 shows an example table of DSL speeds and associated distances from DSLAM equipment, according to one or more embodiments. For a distance of 1000 feet between the DSLAM equipment and the customer premises (e.g., customer home), the DSL speed may be 25 Mbit/sec, as shown in FIG. 12. Now, if acceleration service is provided, a customer location at a 15000 feet distance from the DSLAM equipment may receive data at a rate equivalent to a location 1000 feet from the DSLAM equipment (e.g., 25 Mbit/sec). Although the table shows a DSL speed of 1.5 Mbit/sec for the associated distance of 15000 feet, the acceleration may cause data to be received at a much higher rate due to the reasons discussed above. Therefore, in one embodiment, if a 1.5 Mbit/sec accelerated link (here, CPE1, for example, may be at the customer premises) may perform at the same level as a 25 Mbit/sec non-accelerated DSL line, the provider can offer a 25 Mbit/sec service even if the DSLAM equipment were 15000 feet away. In one embodiment, accelerated DSLAM may be employed in which speeds may be increased based on LAN-side power over Ethernet at the CPE.

Therefore, in one or more embodiments, while the primary performance value proposition may exist with an exchange heterogeneous network, the exchange heterogeneous network may also have a unique value proposition of reducing base station costs. In another example embodiment, placement of CPE1 at a tower and the BPOP functionality at a Base Station Controller (BSC) of a GSM network may allow for higher speeds without increasing link capabilities and/or adding specialized hardware/software to handheld cellular equipment connecting to the GSM network. In one or more embodiments, a network may be referred to as heterogeneous because the networks can be mixed/matched, exchanged with regional networks and intercontinental networks.

Vendor Federation. In one or more embodiments, in a typical WAN optimization (Op) environment, WAN Op equipment may be placed at the head office (e.g., head office 802) and premises of a branch office (e.g., branch office $804_{B-N}$), and accelerated packets may be transported over an MPLS network. In one or more embodiments, accelerated packets from the WAN Op environment may be transmitted through a non-heterogeneous network (e.g., a network owned by company A), an intercontinental heterogeneous network (e.g., another network owned by company A), a regional heterogeneous network or an exchange heterogeneous network, where the level of acceleration sophistication may vary. However, in one or more embodiments, the varied acceleration may occur at a minimum TCP proxy functionality including the mid-mile window sizing (e.g., jitter, pipelining).

In one or more embodiments, therefore, all of the acceleration may not be performed by the non-heterogeneous network, the intercontinental heterogeneous network, the regional heterogeneous network or the exchange heterogeneous network. In one or more embodiments, the end points may also do some of the acceleration.

Service Federation. In one or more embodiments, one of the key differences between multiple vendors offering a variety of cloud services is the location of the service. For example, Amazon®'s Simple Storage Service (Amazon S3™) may have data centers at Virginia, USA, and Europe, and Rackspace® may have storage centers at Texas, USA. Here, a heterogeneous storage cloud may present a uniform access to each of the cloud services along with acceleration between the customer location and the service location. In one or more embodiments, therefore, a service heterogeneous network may be applied to infrastructure clouds such as compute clouds, storage clouds and Content Delivery Networks (CDNs). In one or more embodiments, a service heterogeneous network may also be applied to security cloud services, such as Websense®, and may switch between vendors based on proximity thereof to the branch office (e.g., branch office $804_{B-N}$).

For example, if Rackspace® may have a storage service provider in India, a customer in India who wants to use storage services may utilize Rackspace®'s services. If the customer has a US head office (e.g., head office 802), Amazon S3™ services may be utilized. In one or more embodiments, a common front-end may be created and different service providers may be interfaced to through the front-end. Therefore, in one or more embodiments, service providers may be aggregated. Again, in one or more embodiments, direct/heterogeneous acceleration on top of the closest service may result in substantially better user experience at the lowest cost (e.g., bandwidth cost, software cost, and operational cost).

In one or more embodiments, the insertion models described above may be pre-negotiated and provisioned. In one or more embodiments, components of a heterogeneous network may include domain identification, contract negotiation, contract breach, usage aggregation, billing aggregation, and service/vendor heterogeneous network. In one or more embodiments, domain identification may include establishing, for a collection of domains, a relationship for securely sharing resources. In one or more embodiments, the relationship may be established during the establishment of the connection. In one or more embodiments, routing through domains may be influenced by the service type request. For example, domain A may not have Adobe®'s Real-Time Messaging Protocol (RTMP) acceleration capabilities and domain B may have the aforementioned acceleration capabilities. However, a flow may be routed through a longer distance via domain B due to the pre-established contract. In one or more embodiments, not all nodes of a heterogeneous system may offer external services (e.g., external services 808, 810). Therefore, in one or more embodiments, domain identification may include identifying the nodes of the heterogeneous system through which data may be transmitted.

Enforcement & Data Collection. In one or more embodiments, contract negotiation may include pre-negotiating and provisioning contracts based on per tunnel, per link or contracts based on resources used by actual flow or contracts based on flat cost. In one or more embodiments, remediation and repudiation mechanisms for breaches of contracts may also be specified. In one or more embodiments, remediation mechanisms may be employed to handle breaches of contract, after the breaches may be located and localized to domains. In one or more embodiments, usage aggregation may include collecting usage on a per domain, per flow basis. In one or more embodiments, a Network Monitoring System (NMS) of a domain may receive the heterogeneous traffic, aggregate the collected usage and may feed the collected usage into a Billing System (BSS). In one or more embodiments, as part of the billing aggregation, the usage records that were the results of the heterogeneous traffic may be rated, billed, and transmitted to the BSS of the domain that owns the customer. In one or more embodiments, the customer-domain BSS may generate the bill to be paid. In one or more embodiments, an Operations System (OSS) may perform functions such as and helpdesk. In one or more embodiments, a heterogeneous network may include multiple NMSs, BSSs, and OSSs. In one or more embodiments, depending on the administrative domain that owns the customer, an Extensible Markup Language (XML) feed of the data may be utilized by the corresponding OSS, BSS and NMS.

In one or more embodiments, service/vendor heterogeneous network may encompass features selected inside a branch CPE (e.g., CPE1) and the POP associated with a branch office (e.g., branch office $804_{B-N}$, BPOP) that allow for service abstractions (e.g., common storage irrespective of location) and TCP optimizations to be implemented.

In one or more embodiments, heterogeneous network attributes may include privacy, pair-wise relationships, and N-wise arbitrations (N≥1). In one or more embodiments, the privacy attribute implies that an operator in one domain may not control another domain OSS, BSS and NMS. In one or more embodiments, traffic alone may be routed from one domain to another domain. In other embodiments, operator of one domain may control one or more of OSS, BSS and NMS.

In one or more embodiments, contracts in the heterogeneous network may only be between two providers/operators (e.g., pair-wise). In one or more embodiments, this may allow the two corresponding domains to hide contracts thereof in a multi-heterogeneous environment. In one or more embodiments, the aforementioned contracts may grant access to shared resources.

In one or more embodiments, to ensure fairness across greedy flows in greedy domains, a method of arbitrating resource application/utilization (e.g., through an N-wise rate controller) in domains based on the type of service utilized and the class of service purchased may be implemented. In one or more embodiments, this may ensure that no single greedy domain hogs the whole network. In one or more embodiments, a greedy client may be a client having a TCP/IP connection that hogs a lot of network resource. Also, a greedy domain may be a provider that uses more resources than normal or per contract.

Figure 13:
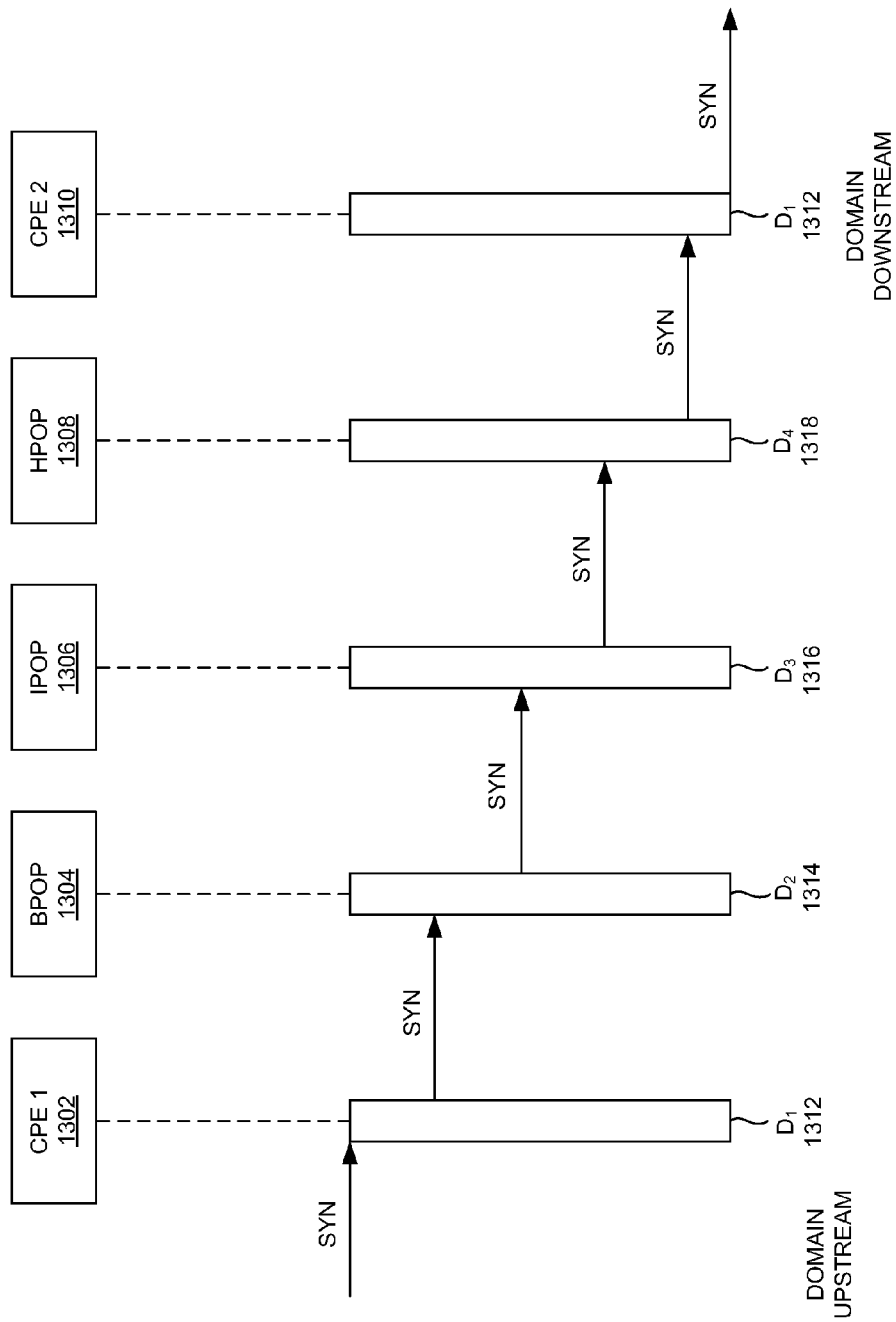
FIG. 13 is a schematic view of traffic flow in a heterogeneous network, according to one or more embodiments.

FIG. 13 shows traffic flow in a heterogeneous network, according to one or more embodiments. In one or more embodiments, traffic may flow downstream (e.g., from branch office $804_{B-N}$ to head office 802) or upstream (e.g., from head office 802 to branch office $804_{B-N}$). In one or more embodiments, the domains may vary from an upstream domain (e.g., a domain in the proximity of the branch office $804_{B-N}$) to a downstream domain (e.g., a domain in the proximity of the head office 802). In one or more embodiments, CPE1 1302 may be a CPE installed at a branch office (e.g., branch office $804_{B-N}$) location, BPOP 1304 may be the POP associated with the branch office (e.g., branch office $804_{B-N}$), IPOP 1306 may be the intermediate POP in the BPOP-HPOP segment, HPOP 1308 may be the POP associated with the head office (e.g., head office 802), and CPE2 1310 may be the CPE installed at the head office (e.g., head office 802). In one or more embodiments, domains $D_1$ 1312, $D_2$ 1314, $D_3$ 1316, and $D_4$ 1318 associated with the respective POPs, as shown in FIG. 13, may be under the purview of different operators/providers/for-profit entities.

In the example embodiment shown in FIG. 13, when a TCP connection is setup, a Synchronize Packet message (e.g., SYN for debit direct) with a sequence number is first sent to the immediately downstream domain, which may, in turn, send a SYN acknowledgement message (e.g., SYN ACK for credit direct) back, along with a sequence number. Here, SYN ACK may serve to acknowledge SYN. Upon receipt of SYN ACK, an acknowledgement message (e.g., ACK) may, again, be sent to the immediately downstream domain to acknowledge the two-way communication. After ACK, data may be transmitted downstream/upstream. Each domain may communicate in a similar manner with the immediately following/preceding domain. The reverse communication may also be effected in a similar manner. In one or more embodiments, SYN-SYN-ACK-ACK flow may establish a flow that determines payments.

Figure 14:
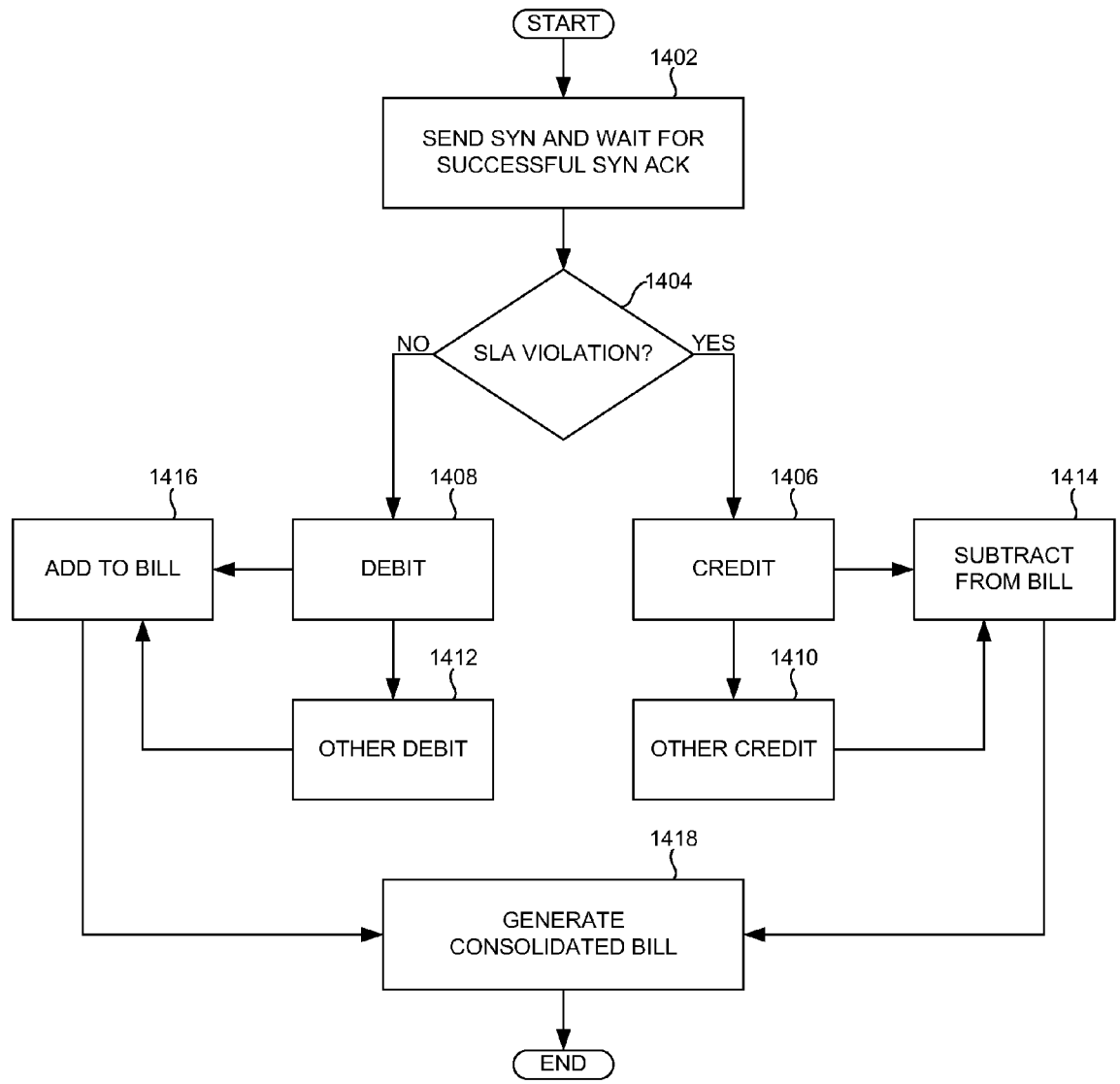
FIG. 14 is a flowchart detailing the operations involved in generating a customer bill, according to one or more embodiments.

FIG. 14 shows a flowchart detailing the operations involved in generating a customer bill, according to one or more embodiments. In one or more embodiments, operation 1402 may involve sending SYN from a domain to the immediately following/preceding domain and waiting for the successful SYN ACK. After the successful receipt of the SYN ACK, an ACK is returned by the sender of the SYN, after which a data may be transmitted through the heterogeneous network. In one or more embodiments, operation 1404 may include checking for an SLA violation. In one or more embodiments, if there is an SLA violation by parties involved in the heterogeneous network communication, an amount associated with the disservice (e.g., at location, upstream domain, and downstream domain) due to the violation may be credited in operation 1406. In one or more embodiments, operation 1410 may involve accumulating other credit on other traffic transmitted in the same connection. In one or more embodiments, operation 1414 may involve subtracting the credit from operation 1406 and the accumulated other credit from operation 1410 from the bill to be generated for the customer. In other embodiments, TCP based flow may be replaced by IP flows and UDP flows. The flow establishment may vary based on TCP/IP or UDP based flows.

In one or more embodiments, if the result of operation 1404 includes no SLA violations, an amount associated with the service (e.g., the use by customer, and other legitimate charges) may be debited in operation 1408. In one or more embodiments, operation 1412 may involve accumulating other debit on other traffic transmitted in the same connection. In one or more embodiments, operation 1416 may involve adding the debit from operation 1408 and the accumulated other debit from operation 1412 to the bill to be generated for the customer.

In one or more embodiments, after a continuous monitoring of traffic, a FIN (e.g., final) message may be sent to terminate the connection. However, in one or more embodiments, a consolidated bill may be generated periodically (e.g., monthly) in operation 1418 as the net charges (e.g., the debit charges in operation 1416 from which the credit charges in operation 1414 may be subtracted) to be paid by the customer. In one embodiment, the SLA check is performed when the flow is established. In another embodiment, the SLA check is performed as traffic progresses on a single flow. In yet another embodiment, the SLA check may be performed per line over time, and per tunnel over time.

In one or more embodiments, the abovementioned operations may be applicable to all connections, irrespective of whether they are accelerated or not. In one or more embodiments, the results of operation 1414 and 1416 may be sent to a BSS associated with the customer premises. In one or more embodiments, the consolidated bill in operation 1418 may be generated by the aforementioned BSS.

In one or more embodiments, within a heterogeneous network, distributed payments due to all providers may be, for example, per flow based, pre-negotiated, monthly, bandwidth based, and/or compression based (e.g., based on the ratio between incoming and outgoing traffic).

Figure 15:
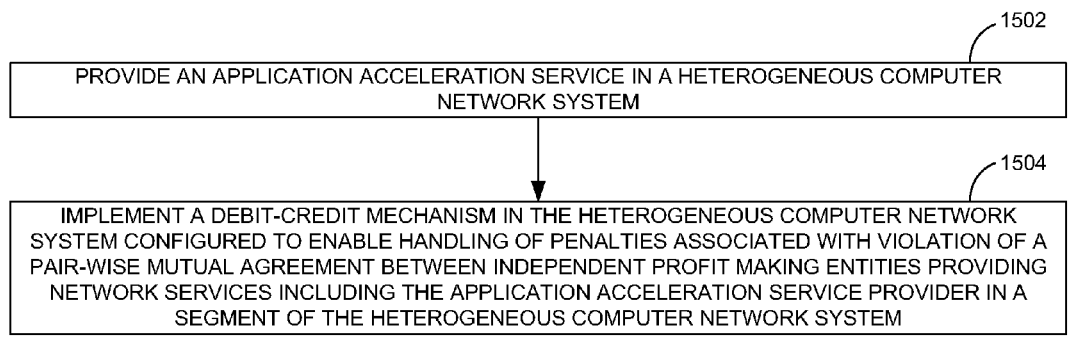
FIG. 15 is a process flow diagram detailing the operations involved in implementing a heterogeneous computer network system including application acceleration as a service, according to one or more embodiments.

Violations. FIG. 15 shows a process flow diagram detailing the operations involved in implementing a heterogeneous computer network system including application acceleration as a service, according to one or more embodiments. In one or more embodiments, operation 1502 may involve providing an application acceleration service in a heterogeneous computer network system.

In one or more embodiments, operation 1504 may involve implementing a debit-credit mechanism in the heterogeneous computer network system configured to enable handling of penalties associated with violation of a pair-wise mutual agreement between independent for-profit entities providing network services including the application acceleration service provider in a segment of the heterogeneous computer network system. It will be understood that the following are examples, and not limitations to the claims described herein. Various modifications and changes are contemplated within the broader scope of the various embodiments based on the peering type. In one or more embodiments, the segment may be a communication link between the head office and the branch office, the branch office and another branch office associated with the head office or the head office and another head office in the computer network. In one or more embodiments, a queuing and/or a routing of data through the segment may be governed by a policy consistent with the pair-wise mutual agreement.

Figure 16:
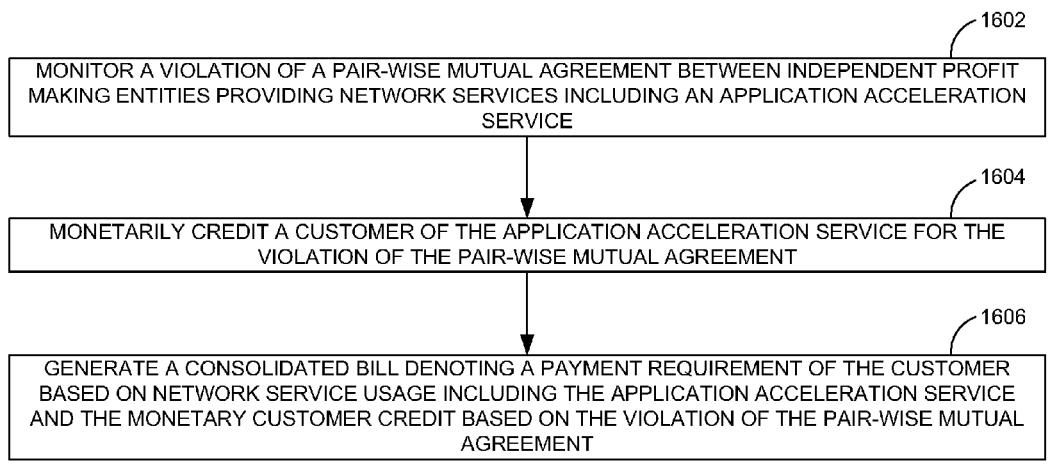
FIG. 16 is a process flow diagram detailing the operations involved in generating a consolidated bill for a customer of an application acceleration service, according to one or more embodiments.

FIG. 16 shows a process flow diagram detailing the operations involved in generating a consolidated bill for a customer of an application acceleration service, according to one or more embodiments. In one or more embodiments, operation 1602 may involve detecting the failure of latency or bandwidth mitigation functions through a monitoring of a violation of a pair-wise mutual agreement between independent for-profit entities providing network services including an application acceleration service in a heterogeneous computer network system. In one or more embodiments, failure of latency or failure of bandwidth mitigation functions as a part of violations of a pair-wise mutual agreement between independent for-profit entities may be monitored. In one or more embodiments, the heterogeneous computer network system may include a computer network. In one or more embodiments, the aforementioned violation may be monitored through a NMS associated with a POP location of a number of POP locations between a head office and a branch office associated with the head office in the computer network.

In one or more embodiments, the number of POP locations may be configured to communicate data associated with an application to be accelerated between the head office and the branch office, the branch office and another branch office associated with the head office or the head office and another head office in the computer network to a POP location closest to a destination location, and then onward to the destination location. In one or more embodiments, operation 1604 may involve monetarily crediting a customer of the application acceleration service for the violation of the pair-wise mutual agreement. In one or more embodiments, operation 1606 may involve generating, through a BSS associated with a location of the customer, a consolidated bill denoting a payment requirement of the customer based on network service usage including the application acceleration service and the monetary customer credit based on the violation of the pair-wise mutual agreement.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A system comprising:
a head office;
a branch office associated with the head office;
a heterogeneous Wide Area Network (WAN) comprising a number of independent for-profit entities providing network services; and
a plurality of Point of Presence (POP) locations between the head office and the branch office in the heterogeneous WAN configured to communicate data through a pay-per-performance peering relationship between the number of independent for-profit entities of the heterogeneous WAN, the communication of the data being sped up through intelligent design of the plurality of POP locations such that each POP location has a capability to analyze a destination of a packet of the data and to communicate the packet between the plurality of POP locations with an unaltered Internet Protocol (IP) address through at least one of a Generic Routing Encapsulation (GRE), an Internet Protocol Security (IPsec), a Multiprotocol Label Switching (MPLS), and a Virtual Local Area Network (VLAN), at least one of the head office and the branch office being configured to generate secured transport data to be transmitted over at least one secure tunnel between at least one intervening firewall such that the data is routed securely through the plurality of POP locations toward a destination, the plurality of POP locations being implemented with a multi-segment architecture and enabling a multi-tenancy in each POP location, and each POP location implemented to provide a WAN optimization and an application acceleration during the communication of the data,
  wherein the WAN optimization and the application acceleration enable a distribution of a number of tasks across the WAN,
  wherein the system implements a debit-credit mechanism configured to handle payments as well as penalties associated with violation of a pair-wise mutual agreement between the number of independent for-profit entities providing network services in a segment of the heterogeneous WAN, and
  wherein the debit-credit mechanism is based on at least one of a bandwidth savings and a reduced latency in the segment of the heterogeneous WAN.

2. The system of claim 1,
wherein the number of independent for-profit entities include an application acceleration service provider,
wherein the segment is a portion of a communication link between the number of independent for-profit entities of the heterogeneous WAN, and
wherein at least one of an accelerating operation and a routing operation of data between the segments is governed by a policy consistent with the pair-wise mutual agreement.

3. The system of claim 2,
wherein the plurality of POP locations is configured to perform an application acceleration function 'A' for a plurality of business entities through a placement of at least one of a collaborative document, a computed document, and a static document of an enterprise application at a closest POP location to a requesting entity,
wherein the acceleration function 'A' applies a bandwidth constraint and a latency constraint as factors of an acceleration service, thereby resulting in the bandwidth savings and the reduced latency between the number of independent for-profit entities of the heterogeneous WAN, and wherein the plurality of POP locations is shared by a plurality of licensed entities of an application acceleration service, each of the plurality of licensed entities having at least one head office and at least one branch office, and each of the plurality of licensed entities leveraging both a shared software and a shared hardware infrastructure of the application acceleration service provider.

4. The system of claim 3, further comprising an external network service as a licensed entity of the application acceleration service, wherein the external network service is contracted to at least one for-profit entity included in the pair-wise mutual agreement, and wherein the external network service comprises a network service external to the head office, the branch office, and the application acceleration service.

5. The system of claim 1,
wherein data associated with the application acceleration is re-routed during an intermediate POP failure through an alternate route associated with another POP location in the computer network,
wherein a service provider owns at least one of a link and an equipment to perform the application acceleration service, and
wherein the application acceleration is performed as a service without any Customer Premise Equipment (CPE) in the head office and the branch office.

6. The system of claim 3, further comprising:
at least one of a CPE device, a branch router, and a head-office router, coupled with at least one of the head office and the branch office:
to perform an Advanced Redundancy Removal (ARR) function to avoid sending previously sent patterns in at least one of a transport stream and a packet stream,
to perform Transmission Control Protocol (TCP) proxies, with varying policies for at least one of TCP windows, buffering and security,
to optionally perform protocol dependent split proxies on at least one of the transport stream and the packet stream,
to generate a secure transport data sent over secure tunnels of at least one of the collaborative document, the computed document, and the static document, and
to communicate the secured transport data between a client device in the branch office and the head office through at least one of an Internet Protocol Security (IPsec) tunnel, a Generic Routing Encapsulation (GRE) tunnel, VLAN, and MPLS labels using IP headers.

7. The system of claim 1,
wherein a bandwidth and latency is measured across a sub-network in a segment of the heterogeneous WAN from a third-party provider included in the pair-wise mutual agreement, and
wherein a requisite network software and a requisite network hardware from another third-party provider included in one of the pair-wise mutual agreement and another pair-wise mutual agreement associated with the heterogeneous WAN is utilized.

8. The system of claim 1,
wherein an insertion model is configured to connect to the plurality of POP locations in the heterogeneous WAN based on any one of obtaining network connectivity from a customer premises, securing the network connection, and routing through the heterogeneous WAN.

9. The system of claim 1, wherein the heterogeneous WAN is part of at least one of:
an intercontinental heterogeneous network comprising a union of the heterogeneous WAN and another intercontinental computer network to provide unified network coverage,
a regional heterogeneous network comprising a union of the heterogeneous WAN and a regional computer network, the regional computer network being more localized than an intercontinental computer network,
an exchange heterogeneous network configured to provide increased acceleration at a reduced cost in the heterogeneous WAN through performing of an increased acceleration in a localized region including one of the head office and the branch office using a third-party equipment, the third-party being governed by the pair-wise mutual agreement,
a vendor heterogeneous network configured to provide increased acceleration in the heterogeneous WAN through utilization of additional acceleration capabilities of a third-party vendor equipment in conjunction with the existing acceleration capabilities in the heterogeneous WAN, the third-party vendor being governed by another pair-wise mutual agreement, and
a service heterogeneous network configured to switch between external network service vendors based on proximity to at least one of the head office and the branch office, the external service vendors being governed by pair-wise mutual agreements.

10. The system of claim 1, wherein a mutual relationship between the segments of the heterogeneous WAN are established on a per flow basis to securely share resources, the flow signifying a packet flow from a source to a destination.

11. The system of claim 1, wherein segment data associated with a network service usage is collected on a packet flow from a source to a destination at least on one of a per day basis, a per week basis, a per month basis, a per link basis, and a per flow basis.

12. The system of claim 1, wherein a service abstraction and a TCP optimization is implemented in the heterogeneous WAN.

13. The system of claim 1, wherein at least one of a remediation mechanism and a repudiation mechanism configured to handle a breach of a contract is specified.

14. The system of claim 13, wherein the breach of the contract is determined to enable an initiation of the at least one of the remediation mechanism and the repudiation mechanism.

15. The system of claim 1, wherein a record associated with a network service usage is analyzed to generate an application acceleration service customer bill.

16. A method comprising:
configuring a plurality of Point of Presence (POP) locations between a head office and a branch office in a heterogeneous Wide Area Network (WAN) comprising a number of independent for-profit entities providing network services;
implementing the plurality of POP locations with a multi-segment architecture, a multi-tenancy capability in each POP location;
communicating data through a pay-per-performance peering relationship between the number of independent for-profit entities of the heterogeneous WAN through the segments thereof;
speeding up the communicated data through intelligent design of the plurality of POP locations such that each POP location has a capability to analyze a destination of a packet of the communicated data, to provide a WAN optimization and an application acceleration during the communication of the data, and to communicate the packet between the plurality of POP locations with an unaltered Internet Protocol (IP) address through at least one of a Generic Routing Encapsulation (GRE), an Internet Protocol Security (IPsec), a Multiprotocol Label Switching (MPLS), and a Virtual Local Area Network (VLAN), wherein the WAN optimization and the application acceleration enable a distribution of a number of tasks across the WAN;

generating secured transport data through at least one of the head office and the branch office to be transmitted over at least one secure tunnel between at least one intervening firewall such that the data is routed securely through the plurality of POP locations toward a destination; and implementing a debit-credit mechanism to handle payments as well as penalties associated with violation of a pair-wise mutual agreement between the number of independent for-profit entities providing network services in a segment of the heterogeneous WAN, wherein the debit-credit mechanism is based on at least one of a bandwidth savings and a reduced latency in the segment of the heterogeneous WAN.

17. The method of claim 16, further comprising:
wherein at least one of an accelerating operation and a routing operation of data between the segments is governed by a policy consistent with the pair-wise mutual agreement, and
wherein the number of independent for-profit entities include an application acceleration service provider.

18. The method of claim 17,
wherein the plurality of POP locations is configured to perform an application acceleration function 'A' for a plurality of business entities through a placement of at least one of a collaborative document, a computed document, and a static document of an enterprise application at a closest POP location to a requesting entity, and
wherein the plurality of POP locations is shared by a plurality of licensed entities of an application acceleration service, each of the plurality of licensed entities having at least one head office and at least one branch office, and each of the plurality of licensed entities leveraging both a shared software and a shared hardware infrastructure of the application acceleration service provider.

19. The method of claim 16, further comprising:
rerouting data associated with the application acceleration during an intermediate POP failure through an alternate route associated with another POP location in the heterogeneous WAN,
wherein a service provider owns at least one of a link and an equipment to perform the application acceleration service, and
wherein the application acceleration is performed as a service without any CPE in the head office and the branch office.

20. The method of claim 16 in a form of a machine-readable medium embodying a set of instructions that, when executed by a machine, causes the machine to perform the method of claim 16.

21. A system comprising:
a heterogeneous Wide Area Network (WAN) comprising a plurality of POP locations and a number of independent entities providing network services, the heterogeneous WAN being configured to communicate data through a pay-per-performance peering relationship between the number of independent entities of the heterogeneous WAN through segments thereof, the communication of the data being sped up through intelligent design of the plurality of POP locations such that each POP location has a capability to analyze a destination of a packet of the data, to provide a multi-tenancy, to provide a WAN optimization and an application acceleration during the communication of the data, and to communicate the packet between the plurality of POP locations with an unaltered Internet Protocol (IP) address through at least one of a Generic Routing Encapsulation (GRE), an Internet Protocol Security (IPsec), a Multiprotocol Label Switching (MPLS), and a Virtual Local Area Network (VLAN), secured transport data being configured to be transmitted over at least one secure tunnel between at least one intervening firewall such that the data is routed securely through the plurality of POP locations toward a destination, and the segments being part of a multi-segment architecture implemented in the heterogeneous WAN, wherein the WAN optimization and the application acceleration enable a distribution of a number of tasks across the WAN; and
a debit-credit mechanism implemented in the system and configured to handle payments as well as penalties associated with violation of a pair-wise mutual agreement between the number of independent entities providing network services in a segment of the heterogeneous WAN, wherein the debit-credit mechanism is based on at least one of a bandwidth savings and a reduced latency in the segment of the heterogeneous WAN.

22. The system of claim 21,
wherein the number of independent entities include an application acceleration service provider,
wherein the debit-credit mechanism monitors a segment being a portion of a communication link between the number of independent entities of the heterogeneous WAN, and
wherein at least one of an accelerating operation and a routing operation of data between segments is governed by a policy consistent with the pair-wise mutual agreement.

23. The system of claim 22,
wherein the plurality of POP locations is configured to perform an application acceleration function 'A' for a plurality of business entities through a placement of at least one of a collaborative document, a computed document, and a static document of an enterprise application at a closest POP location to a requesting entity, and
wherein the plurality of POP locations is shared by a plurality of licensed entities of an application acceleration service, each of the plurality of licensed entities having at least one head office and at least one branch office, and each of the plurality of licensed entities leveraging both a shared software and a shared hardware infrastructure of the application acceleration service provider.

* * * * *